United States Patent [19]
Osaka et al.

[11] Patent Number: 5,638,402
[45] Date of Patent: Jun. 10, 1997

[54] FAST DATA TRANSFER BUS

[75] Inventors: Hideki Osaka, Hiratsuka; Toshihiko Ogura, Ebina; Masao Inoue, Sagamihara, all of Japan

[73] Assignee: Hitachi, Ltd., Tokyo, Japan

[21] Appl. No.: 313,384

[22] Filed: Sep. 27, 1994

[30] Foreign Application Priority Data

Sep. 27, 1993 [JP] Japan ................................. 5-239807
May 20, 1994 [JP] Japan ................................. 6-106853

[51] Int. Cl.$^6$ ................................. H04B 3/00; H04L 25/00
[52] U.S. Cl. ................................. 375/257; 375/219
[58] Field of Search ................................. 375/257, 219, 375/220, 316; 333/32

[56] References Cited

U.S. PATENT DOCUMENTS

| | | | |
|---|---|---|---|
| 3,516,065 | 6/1970 | Bolt et al. | 375/257 |
| 3,619,504 | 11/1971 | DeVeer et al. | 375/257 |
| 3,764,941 | 10/1973 | Nick | 375/257 |
| 3,786,418 | 1/1974 | Nick | 375/257 |
| 4,380,080 | 4/1983 | Rattlingourd | 375/257 |

Primary Examiner—Stephen Chin
Assistant Examiner—Betsy P. Lee
Attorney, Agent, or Firm—Antonelli, Terry, Stout & Kraus, LLP

[57] ABSTRACT

A bus transceiver in a first signal processing circuit is connected to one end of a first bus connecting line for transferring a data pulse signal. A bus transceiver in a second signal processing circuit is connected to one end of a second bus connecting line for transferring a data pulse signal. Connected to the other end of the first bus connecting line is a first termination resistor. Connected to the other end of the second bus connecting line is a second termination resistor. In a portion of a predetermined length (parallel coupling portion) in the first and second bus connecting lines, the interval between the first and second bus connecting lines is held substantially constant so as to produce capacitive and inductive coupling between both the bus connecting lines. Each of the first and second bus transceivers includes a bus driver and a bus receiver. The bus receiver in the first bus transceiver generates a pulse signal substantially equal to an output pulse signal which was generated from the bus driver in the second bus transceiver, based on a pulse waveform induced in the parallel coupling portion on the first bus connecting line by the output pulse signal from the second bus transceiver.

16 Claims, 21 Drawing Sheets

(G) DRIVE PULSE WAVEFORM $V_o(t)$ (R) PROPAGATING DRIVE PULSE WAVEFORM $V_r(t)$ (B) BACKWARD CROSSTALK $V_b(t)$ (F) FORWARD CROSSTALK $V_f(t)$

FAST DATA TRANSFER BUS

BACKGROUND OF THE INVENTION

The present invention relates to a signal bus which is suitable for use in information processing apparatuses, and more particularly to a bus to which a plurality of signal processing means implemented in semiconductor integrated circuits or the like are connected.

Buses currently used in an information processing apparatus such as a personal computer, work station, and so on are designed to accomplish fast data transfer. As the use of a multi-processor becomes popular and a larger number of I/O devices are employed, the number of circuits connected to a bus are also increased. FIG. 2 shows an example of a conventional bus configuration which includes a bus connecting line 1; a bus driver 2; a bus receiver 3; a bus transceiver 4-1; and semiconductor integrated circuits 10-1 to 10-5. A convention bus configuration is disclosed, for example, in Taguchi et al, "Comparison of small amplitude interfaces for bus systems for 100 MHz era", Nikkei Electronics, No. 591, Sep. 27, 1993, pp. 269–290.

As shown in FIG. 2, five semiconductor integrated circuits 10-1, 10-2, 10-3, 10-4, and 10-5 are connected to the bus connecting line 1 in this example. More specifically, the semiconductor integrated circuits 10-1 and 10-5 are respectively connected to opposite ends of the bus connecting line 1, while the semiconductor integrated circuits 10-2, 10-3, and 10-4 are connected to respective branch lines from the bus connecting line 1. A bus line portion between branch points at both ends is called "a main line", and a line portion from each branch point to an associated one of the semiconductor integrated circuits 10-1 to 10-5 is called a "stub".

The semiconductor integrated circuits 10-2 to 10-5 are provided with bus transceivers 4-1 to 4-5, respectively, each having the bus receiver 2 and the bus driver 3. Data communications among these semiconductor integrated circuits 10-1 to 10-5 are performed through the bus connecting line 1 and the bus transceivers 4-1 to 4-5. It should be noted that while an example of a bus configuration having five semiconductor integrated circuits connected thereto has been explained, a multiplicity of similar bus lines are generally provided in accordance with the width of a bus required for a particular purpose.

If a bus line as described above is used for data transfer, for example, at an operating frequency of 30 MHz or more, wave distortion may occur in signals transferred on the bus connecting line 1, thus rendering semiconductor integrated circuits connected thereto more susceptible to erroneous operations. Main causes of this waveform distortion include load capacitances of the bus receivers 2 and the bus drivers 3 arranged in the semiconductor integrated circuits 10-1 to 10-5 and reflection of a signal caused by the branching of the bus connecting line 1. Specifically, while the bus connecting line 1 behaves as a distributed constant circuit in the above-mentioned operating frequency region, the branching of the bus connecting line 1 and the load capacitances cause the characteristic impedance of the bus line to be significantly disturbed, resulting in the waveform distortion in signals transferred on the bus connecting line 1. The branching and load capacitances also cause a lower signal propagation velocity, thereby limiting fast data transfer operations.

For example, when a bus line is formed on a printed circuit board made of glass epoxy resin, the characteristic impedance possessed by the bus line ranges approximately between 50 Ω and 100 Ω. However, if the bus line has branch lines, its characteristic impedance is decreased by one-half. Specifically, assuming that the characteristic impedance of the line is 100 Ω, the branch lines cause the characteristic impedance to decrease to 50 Ω. In this case, a reflection coefficient is −⅓ at a branch point, so that about 33 percent of a negative reflection wave is generated as a backward pulse. Also, on a stub which is a line from a branch point to an associated semiconductor integrated circuit, if the ends of the stub are not terminated, a signal on the stub is repeatedly reflected at both ends of the stub, since the reflection coefficient on the semiconductor integrated circuit side is substantially one, thus requiring a long time until the signal waveform is settled in the entire system. Specifically, a time required for the waveform to settle is approximately double a signal propagation time through the largest distance on a bus line from one end to the other.

A signal propagation velocity Vp on a main line is also slowed down by stubs branched therefrom and load capacitances. As mentioned above, the main line is defined as a line between the branch points furthest away from each other on a bus connecting line. Assuming a bus line connected with loads having capacitances at regular intervals, a signal propagation velocity Vp' slowed down by the capacitances is expressed by the following equation (1):

$$Vp' = Vp \cdot (1 + Cd/Co)^{-\frac{1}{2}} \qquad (1)$$

where Cd is an increased capacitance of the bus line by a capacitance distributed at a unit line length, and Co is a capacitance of the line per unit length.

For example, with a bus line having semiconductor integrated circuits each having an input capacitance of 15 pF connected thereto at intervals of 3 cm, since the capacitance of the line per unit length ranges from Co to 1 pf/cm, the signal propagation velocity Vp' is slowed down to 0.4 Vp. Specifically, when eight semiconductor integrated circuits are connected to a bus of 30 cm in length, a settling time is approximately 7.5 nsec if the bus is terminated, and approximately 15 nsec if the bus is not terminated. Therefore, an upper limit of the operating frequency is restricted to 66 MHz with the terminated bus, and 33 MHz with the non-terminated bus, respectively. Generally speaking, a settling time of a waveform on a bus depends on the length of a bus and the number of loads connected to the bus. As a result, these factors have heretofore limited a fast data transfer capability of the bus.

Waveform distortion of signals and slower propagation velocity due to reflection as described above are made worse as an increased number of semiconductor integrated circuits are connected to a bus and as the operating frequency is higher, thus limiting any improvement in the operation performance of the bus.

Further, with the above-mentioned contact branch bus, it is difficult to realize so-called live insertion/withdraw, i.e., inserting and/or withdrawing, during operation, a semiconductor integrated circuit or a module including a semiconductor integrated circuit, into and/or from a bus, without adversely affecting other semiconductor integrated circuits connected to the same bus. This is because a module, to be connected to the bus, has static electricity which will destroy other semiconductor integrated circuits already connected to the bus, and also because a change in load capacitance due to insertion or withdrawal of the module results in largely distorted signal waveforms on the bus.

SUMMARY OF THE INVENTION

It is an object of the present invention to provide a high performance bus which is capable of solving the above-mentioned problems inherent in the prior art, i.e., which is capable of preventing the occurrence of waveform distortion of signals transferred on the bus and any slow-down of a signal propagation velocity even at a high operating frequency, irrespective of a number of signal processing means connected to the bus.

It is another object of the present invention to provide a bus which enables live insertion/withdrawal of signal processing means into and from the bus.

A bus connecting line is capacitively and inductively coupled to another bus connecting line in a signal transmission section. When transmitted data output from a signal processing means reaches the signal transmission section through a bus connecting line connected thereto, a differential waveform is generated by a capacitive and inductive coupling action and transferred, as an induced signal on the other bus connecting line, to another signal processing means. Since a bus receiver in each signal processing means has an integrating circuit, the received data signal of a differential waveform is integrated by this integrating circuit so that the data of the original waveform transmitted from the signal processing means is restored. In this data transfer, since the bus connecting lines are terminated at the respective ends for providing impedance matching, the transmitted data is absorbed at the ends, thus avoiding reflection of the signal.

When a signal processing means is inserted or withdrawn through a connector, noise may be generated on a bus connecting line connected thereto. This noise, however, is absorbed by the matching termination at the end of the bus connecting line. Also, static electricity on the signal processing means to be connected to the bus connecting line is blocked by the capacitively and inductively coupled signal transmission section.

DESCRIPTION OF THE PREFERRED EMBODIMENTS

Embodiments of the present invention will hereinafter be described with reference to the accompanying drawings.

Figure 1:
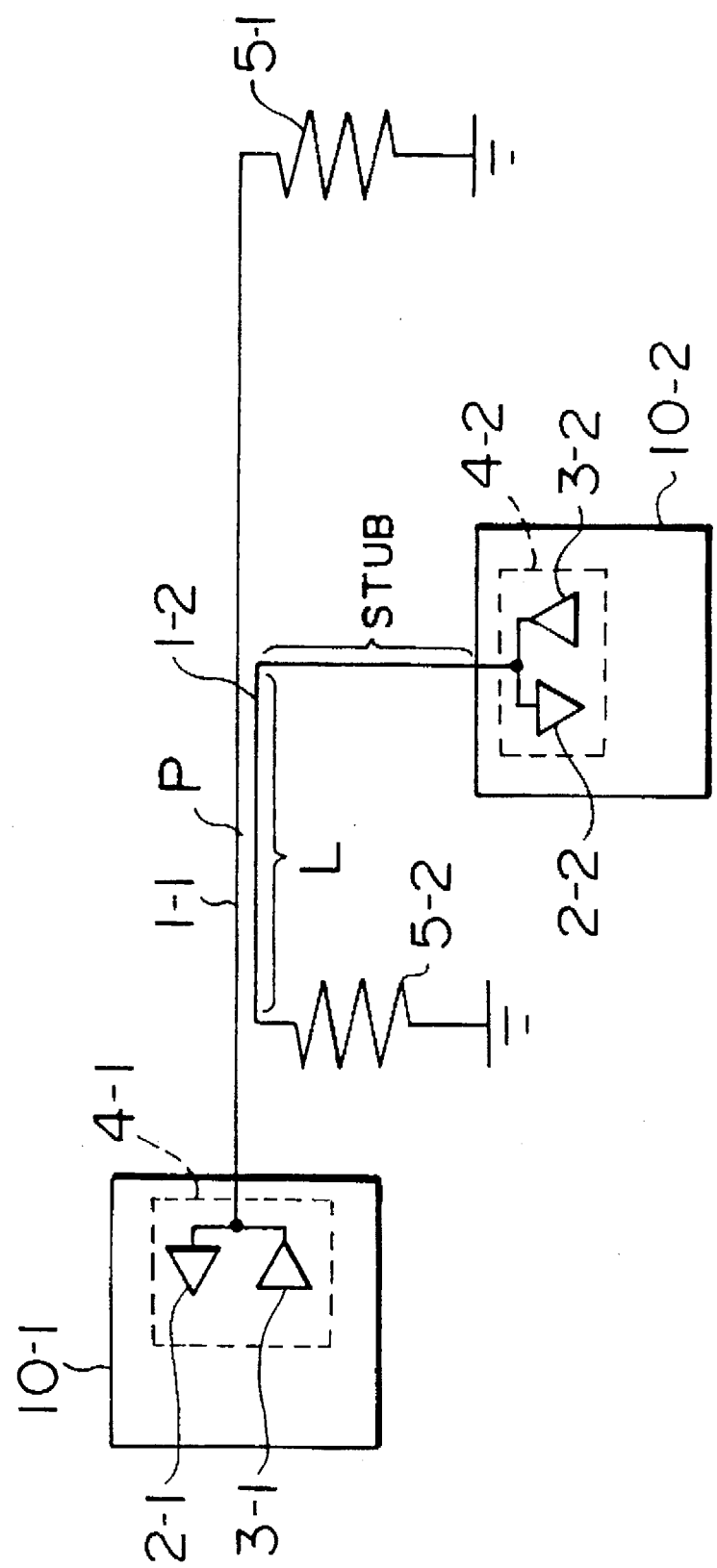
FIG. 1 is a schematic circuit diagram showing the configuration of a non-contact bus according to a first embodiment of the present invention.
Figure 2:
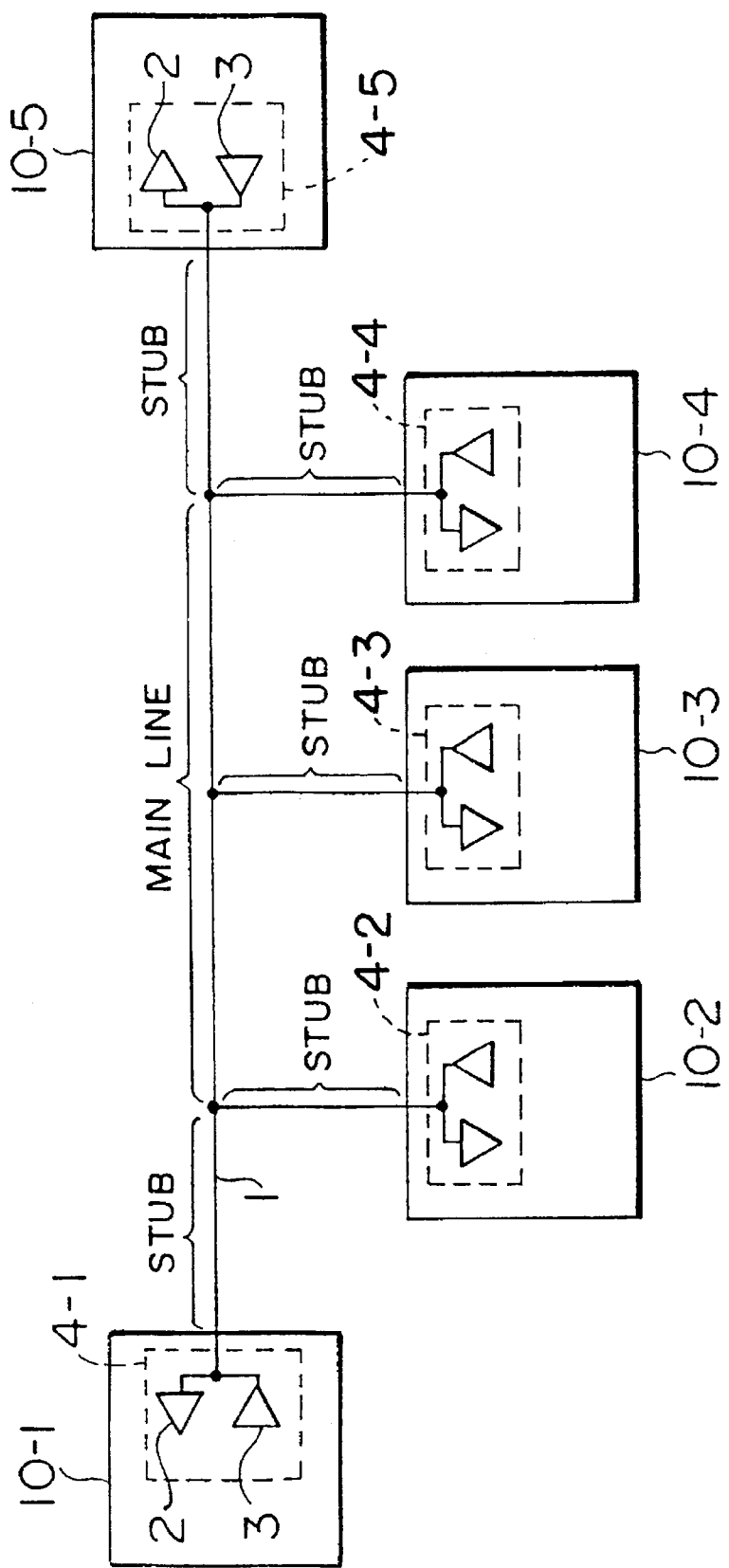
FIG. 2 is a block diagram showing an exemplary configuration of a conventional bus.

FIG. 1 shows the configuration of a non-contact bus according to a first embodiment of the present invention. The illustrated non-contact bus includes bus connecting lines 1-1, 1-2; bus transceivers 4-1, 4-2; bus drivers 3-1, 3-2; bus receivers 2-1, 2-2; termination resistors 5-1, 5-2; and two semiconductor integrated circuits 10-1, 10-2 connected to the bus.

As shown in FIG. 1, the semiconductor integrated circuit 10-1 includes the bus transceiver 4-1 having the bus receiver 2-1 and the bus driver 3-1, while the semiconductor integrated circuit 10-2 includes the bus transceiver 4-2 having the bus receiver 2-2 and the bus driver 3-2. An input of the bus receiver 2-1 and an output of the bus driver 3-1 in the semiconductor integrated circuit 10-1 are connected to one end of the bus connecting line 1-1, the other end of which is terminated by a termination resistor 5-1 for providing impedance matching. Also, an input of the bus receiver 2-2 and an output of the bus driver 3-2 in the semiconductor integrated circuit 10-2 are connected to one end of the other bus connecting line 1-2, the other end of which is terminated by a termination resistor 5-2 for providing impedance matching. In this way, at the other ends of the bus connecting lines 1-1 and 1-2, signal reflection is prevented.

Parts P (having a length L) of the respective bus connecting lines 1-1 and 1-2 are closely spaced by a constant interval and thus substantially in parallel with each other, so that the bus connecting lines 1-1 and 1-2 are strongly electrically coupled in these parts. In other words, the bus connecting lines 1-1 and 1-2 do not contact each other at all or are not connected to each other. These parts P of the respective bus connecting lines having a length L, which are closely aligned in parallel with each other, will hereinafter be called a "parallel coupling portion" in this specification. The bus connecting line 1-2 is bent at an angle substantially close to a right angle at both ends of the parallel coupling portion so as to be away from the bus connecting line 1-1, in such a manner that portions other than the parallel coupling portion of the bus connecting lines 1-1 and 1-2 present less electric coupling. Also, a portion of the bus connecting line 1-2, for example, from an end (or a bending point) of the parallel coupling portion P to the semiconductor integrated circuit 10-2, provided for transferring a signal thereto, will be called the "stub" in this specification, corresponding to the name used in the prior art. Further, a direction in which a signal is transferred on the bus connecting line when the semiconductor integrated circuit is a data source will be defined a "signal propagation direction". The signal propagation direction may be paraphrased as a direction from the semiconductor integrated circuit on the bus connecting line to an associated termination resistor. Thus, in the embodiment shown in FIG. 1, the bus connecting lines 1-1 and 1-2 are arranged such that the respective signal propagation directions are reverse to each other in the parallel coupling portion P.

With the configuration described above, a signal output from the semiconductor integrated circuit 10-1 to the bus connecting line 1-1 is transferred to the bus connecting line 1-2 in the parallel coupling portion P and then sent to the semiconductor integrated circuit 10-2 through the stub. Likewise, a signal output from the semiconductor integrated circuit 10-2 to the bus connecting line 1-2 is transferred to the bus connecting line 1-1 in the parallel coupling portion P and then sent to the semiconductor integrated circuit 10-1. In this way, signals are communicated between the semiconductor integrated circuits 10-1 and 10-2 through the mutually non-contact bus connecting lines 1-1 and 1-2.

The principles of this signal propagation will be next explained with reference to FIGS. 3A and 3B.

Figure 3A:
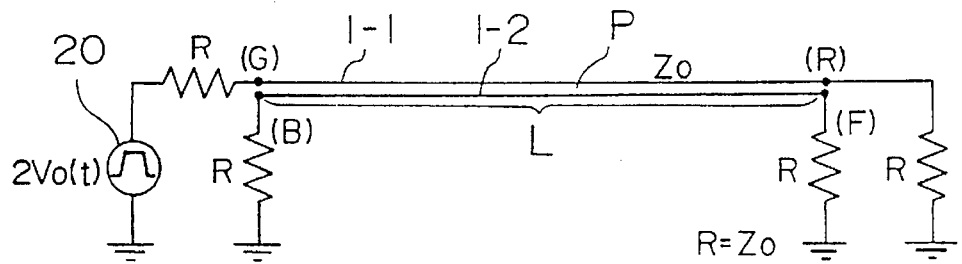
FIGS. 3A and 3B are diagrams for explaining the principles of a non-contact bus.

FIG. 3A shows a basic circuit wherein two bus connecting lines partially form a parallel coupling portion P such that crosstalk is induced between these bus connecting lines. As illustrated, the bus connecting lines 1-1 and 1-2 include a parallel coupling portion P in which parts of the respective connecting lines having a length L are spaced apart by a substantially constant narrow interval so as to be in parallel with each other. Both ends of the respective bus connecting lines 1-1 and 1-2 are terminated by a termination resistor R for impedance matching. One end of the bus connecting line 1-1 is further connected to a pulse source 20 through the termination resistor R. The end of the bus connecting line 1-1 in the parallel coupling portion P, connected to the pulse source 20, is designated (G), and the other end of the same is designated (R). Also, the end of the bus connecting line 1-2 in the parallel coupling portion P, opposing the end (G) is designated (B), and the other end opposing the end (R) is designated (F).

The pulse source 20 supplies a rectangular wave having a pulse width Tw from the end (G) of the bus connecting line 1-1 as a drive pulse. In this event, voltages as shown in FIG. 3B are generated at the respective ends (G), (R), (B) and (F) of the bus connecting lines 1-1 and 1-2. Specifically, in FIG. 3B, a chart (G) shows a waveform of the drive pulse at the end (G) of the bus connecting line 1-1; and (R) a waveform of the drive pulse appearing at the end (R) of the bus connecting line 1-1 after propagating through the parallel coupling portion P. In this embodiment, since the characteristic impedance of the lines is constant, no substantial signal distortion is caused by the propagation of a signal through these lines.

When the drive pulse propagates through the bus connecting line 1-1, pulses appear on the bus connecting line 1-2 in response to the rising and falling edges of this drive pulse. These pulses are utilized to produce a pulse substantially equal to the drive pulse.

Figure 4A:
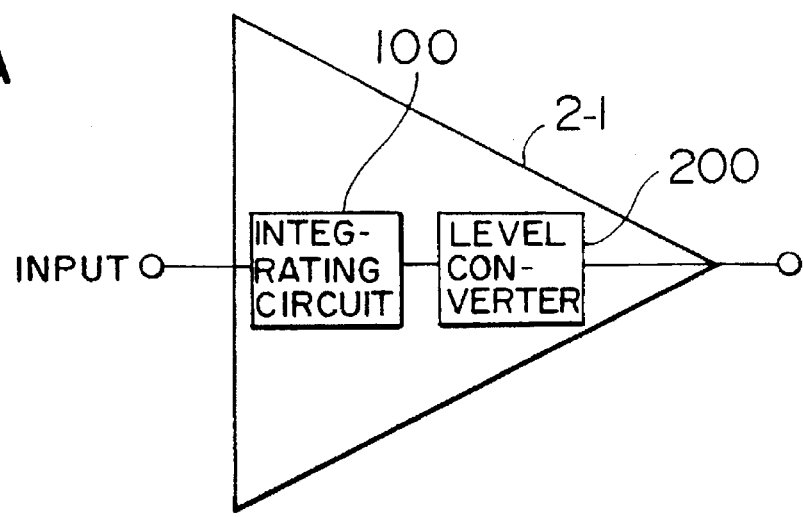
FIGS. 4A, 4B and 4C are block diagrams showing internal configurations of a bus receiver according to the embodiment illustrated in FIG. 1.
Figure 4B:
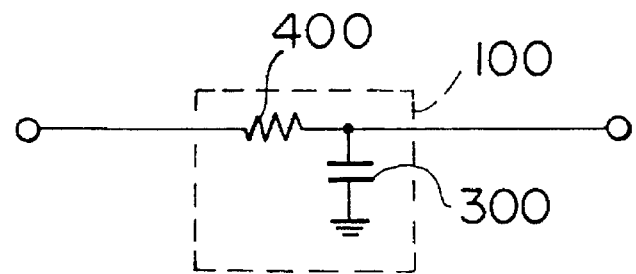
Figure 4C:
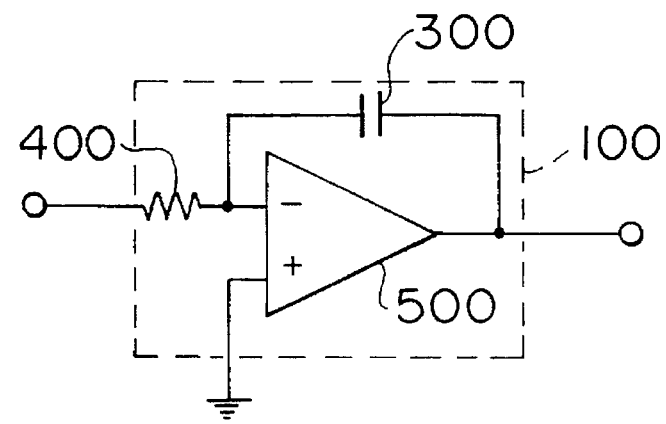

FIG. 4A shows a block diagram showing the internal configuration of the bus receiver 2-1 which includes an integrating circuit 100 and a level converter 200. In FIG. 4A, a differential waveform signal input to the bus receiver 2-1 is integrated by the integrating circuit 100 to be demodulated, and then is subjected to a voltage level conversion by the level converter 200 so as to match its voltage level with a device to be used. In this way, data transfer can be bi-directionally performed without producing waveform distortion in a propagating signal, so that fast bus connecting lines can be provided. The integrating circuit 100 is composed of a capacitor 300 and a resistor 400 as shown in a detailed circuit diagram of FIG. 4B. This integrating circuit 100 may be readily implemented by a semiconductor integrated circuit. Alternatively, the integrating circuit 100 may be implemented by using a high gain operational amplifier or the like. An example of the latter implementation is shown in FIG. 4C. The configuration of FIG. 4C includes an operational amplifier 500 which constitutes the integrating circuit 100 together with a resistor 400 and a capacitor 300. The resulting integrating circuit 100 allows for a high gain bus receiver.

Since the semiconductor integrated circuit 10-2 shown in FIG. 1 also has the bus receiver 2-2 similar to the above described, a signal induced from the drive pulse, having a differential waveform, on the bus connecting line 1-2 in the parallel coupling portion P can be demodulated to a signal having substantially the same waveform as the original drive pulse. Further, if the bus receiver 2-2 is configured to have a high impedance, the reflection coefficient at the end of the stub proximal to the bus receiver 2-2 can be set to one at maximum, thus producing an additional effect of increasing the magnitude of an input signal by a factor of two.

As described above, in this embodiment, the bus connecting lines 1-1 and 1-2 are electrically coupled in a non-contact form, and the ends of the respective bus connecting lines 1-1 and 1-2 are terminated for impedance matching, thus making it possible to eliminate multi-reflection on the bus connecting lines and significantly reduce waveform distortion of signals propagating therethrough. Further, since the bus connecting lines 1-1 are 1-2 are coupled in a non-contact form, a load capacitance of the semiconductor integrated circuit 10-2 is not connected to the bus connecting line 1-1, thus avoiding waveform distortion of propagating signals due to the load capacitance.

Similarly, when data is transferred from the semiconductor integrated circuit 10-2 to the semiconductor integrated circuit 10-1, the drive pulse on the bus connecting line 10-2 causes crosstalk to be induced from the bus connecting line 1-2 to the bus connecting line 1-1 in the parallel coupling portion P, whereby a signal having a differential waveform of the drive pulse is generated on the bus connecting line 1-1, and reaches the semiconductor integrated circuit 10-1. Since the bus receiver 2-1 in the semiconductor integrated circuit 10-1 is also provided with an integrating circuit at the first stage, the differential waveform signal is demodulated by this integrating circuit to a signal having the same waveform as the original drive pulse. In this event, although the signal propagates toward the termination resistor 5-1 on the bus connecting line 1-1, this signal is absorbed by the termination resistor 5-1, so that no reflected wave will occur, and accordingly transferred data is not affected.

In this way, with the non-contact bus configuration of the bus connecting lines 1-1 and 1-2, signals are induced at the ends (B) and (F) of the bus connecting line 1-2 at the falling edge of the drive pulse. These induced signals are generated by electrostatic coupling and inductive coupling between the bus connecting lines 1-1 and 1-2 in the parallel coupling section P and are called "crosstalk".

Figure 3B:
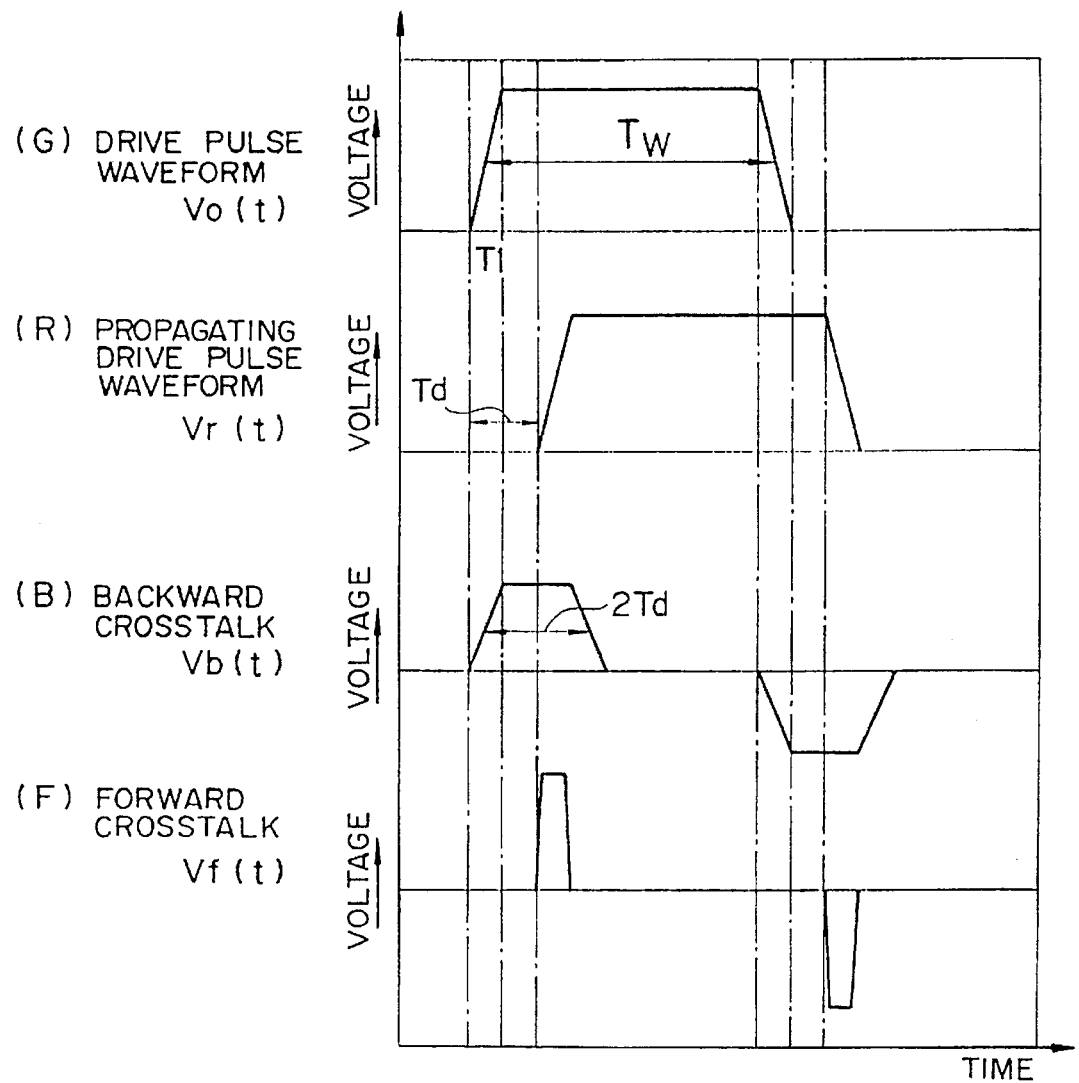

As is well known in the art, voltage waveforms of the crosstalk produced at the ends (B) and (F) of the bus connecting line 1-2 in FIG. 3A are different as shown in FIG. 3B. The crosstalk generated at the end (B) is called "backward crosstalk" and has a waveform of a pulse width 2 Td as shown in a waveform chart (B) of FIG. 3B, where Td represents a time required for a signal to propagate through the parallel coupling portion P of the length L. The crosstalk generated at the end (F) in turn is called "forward crosstalk" and has a voltage waveform, the pulse width of which is approximately equal to a rising or falling time of the drive pulse, as shown in a chart (F) of FIG. 3B. The forward crosstalk having a voltage Vd is generated at the time the drive pulse, propagating through the bus connection line, changes to low or high level (rising or falling time).

Assuming that the waveform of the drive pulse at the end (G) is represented by Vo(t), a backward crosstalk voltage Vb generated at the end (B) is expressed by the following equation (2), and a forward crosstalk voltage Vf generated at the end (F) by the following equation (3):

$$Vb(t) = Kb \cdot \{Vo(t) - Vo(t - 2Td)\} \quad (2)$$

$$Vf(t) = Kf \cdot L \cdot d/dt \, Vo(t - Td) \quad (3)$$

where $$Kb = \frac{1}{4}(Lm/Lo + Cm/Co) \quad (4)$$

$$Kf = -\frac{1}{2}Vp \cdot (Lm/Lo - Cm/Co) \quad (5)$$

Kf: Forward Crosstalk Coefficient;
Kb: Backward Crosstalk Coefficient;
Vp: Velocity of Pulse Propagating through Line;
L: Length of Parallel Coupling Portion;
Td: Signal Propagating Time over Length L of Parallel Coupling Portion (=L/Vp);
Lm: Mutual Inductance Between Two Lines per Unit Length;
Lo: Self Inductance of Single Line per Unit Length;
Cm: Mutual Capacitance between Two Lines per Unit Length; and
Co: Short-Circuit Capacitance of Single Line per Unit Length.

As is apparent from the foregoing equation (3), The signal waveform of the forward crosstalk at the end (F) on the bus connecting line 1-2 is a differential waveform of the drive pulse. For example, when a printed circuit board made of glass epoxy resin is used as a means for holding the bus connecting lines 1-1 and 1-2 spaced by a constant interval over the whole length, the forward crosstalk coefficient Kf is approximately 0.1 nsec/m. Therefore, assuming that the drive pulse is 5 V; its rising/falling time 0.1 nsec; the length of the parallel coupling portion 10 cm; and the signal propagation velocity Vp approximately 15 cm/nsec, a peak value of the forward crosstalk voltage Vf generated at the end (F) is approximately 0.5 volts. This is a sufficient magnitude for discriminating the signal. Likewise, the backward crosstalk coefficient Kb is approximately 0.3 nsec/m, and a peak voltage of the backward crosstalk voltage Vb generated at the end (B) is approximately 1.5 volts under the same condition. This is also a sufficient magnitude for discriminating the signal.

Turning back to FIG. 1, when a rectangular pulse signal is transmitted from the bus driver 3-1 in the semiconductor integrated circuit 10-1, this rectangular pulse signal propagates through the bus connecting line 1-1, and causes a crosstalk voltage to be induced on the bus connecting line 1-2 in the parallel coupling portion P of the length L, as explained in connection with FIG. 3. The generated crosstalk propagates through the stub and reaches the semiconductor integrated circuit 10-2. The signal waveform input to the semiconductor integrated circuit 10-2 is a differential waveform of the rectangular pulse signal on the bus connecting line 1-1. For this reason, the bus receiver 2-2 in the semiconductor integrated circuit 10-2 is provided with an integrating circuit at the first stage which is used to integrate the differential waveform signal to demodulate to substantially the same waveform of the original rectangular pulse signal output from the bus driver 3-1 in the semiconductor integrated circuit 10-1. As will be appreciated, while one-bit non-contact bus lines have been shown in this embodiment, the bus width may be extended by using a multiplicity of the equally configured bus lines.

Figure 5:
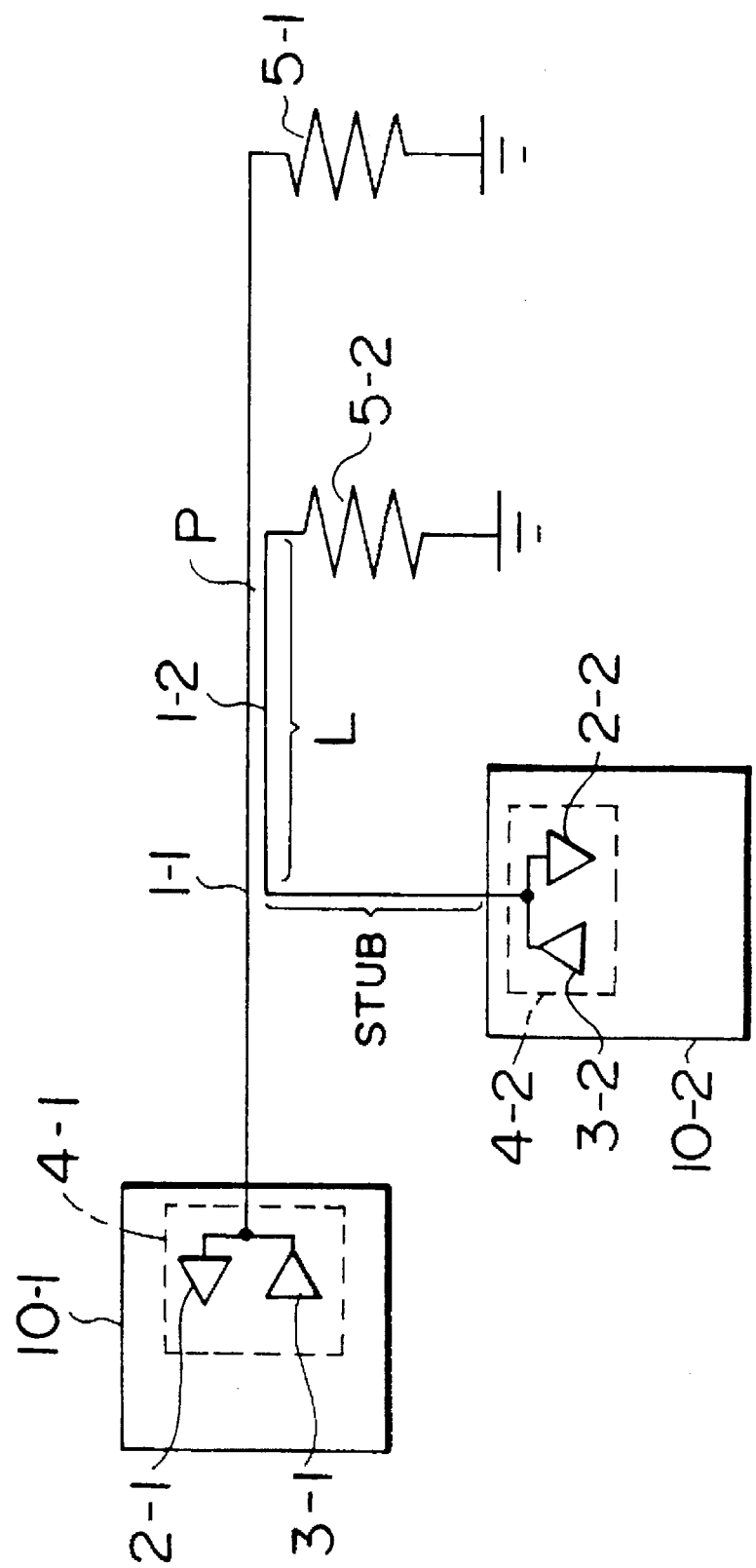
FIG. 5 is a schematic circuit diagram showing the configuration of a non-contact bus according to a second embodiment of the present invention.

FIG. 5 shows the configuration of a non-contact bus according to a second embodiment of the present invention. Elements corresponding to those in the first embodiment are designated by the same reference numerals, and repetitive explanation thereof will be omitted. The designation of the same reference numerals to corresponding elements in different drawings will be applied likewise to the explanation given below. As shown in FIG. 5, in this embodiment, the direction of a bus connecting line 1-2 with respect to a bus connecting line 1-1 in the parallel coupling portion P is different from that of the first embodiment. Specifically, the bus connecting lines 1-1 and 1-2 are arranged such that transmitted signals propagate in the same direction on the bus connecting lines 1-1 and 1-2.

In this embodiment, therefore, data transfer is achieved by utilizing a backward crosstalk voltage. As described above, the voltage waveform of the backward crosstalk has a pulse width equal to 2 Td, and may be utilized at an operating frequency which corresponds to one-half or less of the operating frequency, i.e., the data pulse width Tw of transferred data. Regarding a peak value of the backward crosstalk voltage, if a propagation delay time Td is larger than a rising/falling time T1 of the transmitted data signal, the backward crosstalk voltage does not depend on the length L of the parallel coupling portion P, as is understood from the equations (2), (4). Therefore, the length L of the parallel coupling portion only has to fall within a range expressed by the following equation (6):

$$Tw > 2Td = 2L/Vp$$

i.e., $$Vp \cdot T1 < L < Tw \cdot Vp/2 \qquad (6)$$

With this equation, assuming, for example, that the operating frequency is 200 MHz (the data pulse width Tw is equal to 5 nsec) and the rising/falling time T1 is 1 nsec, the length L of the parallel coupling portion P is calculated to be 15–20 cm.

Thus, since the length L of the parallel coupling portion can be arbitrarily set as long as it falls within the range expressed by the equation (6), this embodiment has an additional effect that the freedom in device mounting design is increased, other than the effect produced by the first embodiment. While the data pulse width Tw is as short as the rising/falling time T1 of the drive pulse (for example, 1 nsec as mentioned above) in the embodiment shown in FIG. 1, the data pulse width Tw in this embodiment is substantially equal to 2 Tw (for example, 2.0–2.6 nsec). Since the duration of the data pulse is longer by a factor of two or more, an input signal, when demodulated in a bus receiver 2, can be reliably detected and demodulated.

Figure 6:
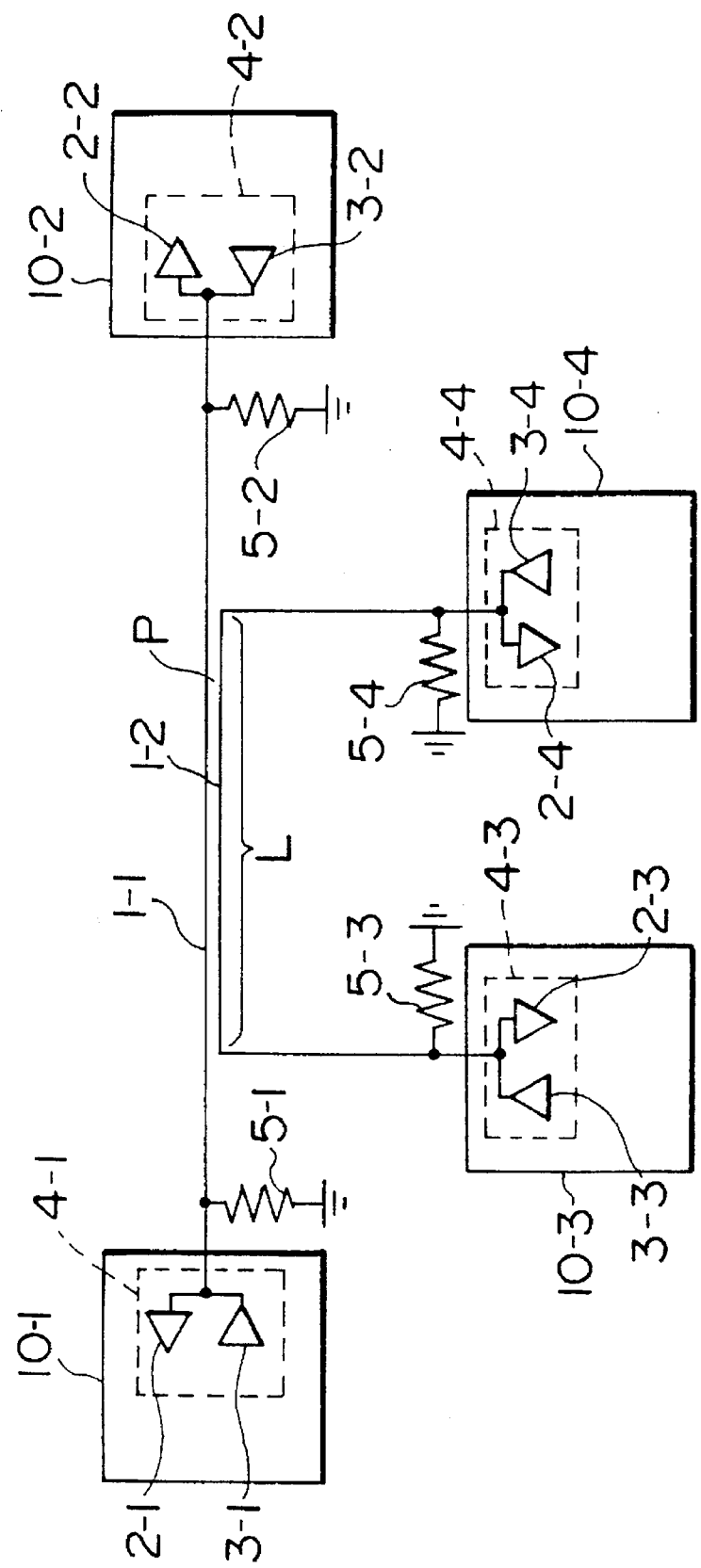
FIG. 6 is a schematic circuit diagram showing the configuration of a non-contact bus according to a third embodiment of the present invention.

FIG. 6 shows the configuration of a non-contact bus according to a third embodiment of the present invention. This non-contact bus additionally includes bus receivers 2-3, 2-4; bus drivers 3-3, 3-4; termination resistors 5-3, 5-4; and semiconductor integrated circuits 10-3, 10-4. As shown in FIG. 6, four semiconductor integrated circuits 10-1, 10-2, 10-3, and 10-4 are connected to the bus in this embodiment.

A bus connecting line 1-1 is connected at one end thereof with a bus receiver 2-1 and a driver 3-1 in the semiconductor integrated circuit 10-1 and at the other end thereof with a bus receiver 2-2 and a bus driver 3-2 in the semiconductor integrated circuit 10-2. A bus connecting line 1-2 in turn is connected at one end thereof with the bus receiver 2-3 and the bus driver 3-3 in the semiconductor integrated circuit 10-3 and at the other end thereof with the bus receiver 2-4 and the bus driver 3-4 in the semiconductor integrated circuit 10-4. The bus connecting line 10-1 is further terminated by termination resistors 5-1 and 5-2 for impedance matching near the semiconductor integrated circuits 10-1 and 10-2, respectively. The bus connecting line 1-2 is also terminated by the termination resistors 5-3 and 5-4 near the semiconductor integrated circuits 10-3 and 10-4, respectively. Part of the bus connecting line 1-1 between the termination resistors 5-1 and 5-2 together with part of the bus connecting line 1-2 between the termination resistors 5-3 and 5-4 form a parallel coupling portion P of a length L.

This configuration is designed to utilize forward crosstalk and backward crosstalk in the parallel coupling portion P to enable data transfer from the semiconductor integrated circuits 10-1 and 10-2 to the semiconductor integrated circuits 10-3 and 10-4 as well as data transfer from the semiconductor integrated circuits 10-3 and 10-4 to the semiconductor integrated circuits 10-1 and 10-2. More specifically, for a drive pulse transmitted from the semiconductor integrated circuit 10-1, the semiconductor integrated circuit 10-3 utilizes backward crosstalk to receive data, and the semiconductor integrated circuit 10-4 utilizes forward crosstalk to receive the data. Since this configuration enables a large number of semiconductor integrated circuits to be mounted without increasing lines on a printed circuit board such, an apparatus can be reduced in size.

It should be noted that, with the present invention, data transfer between semiconductor devices connected to the same bus connecting line, i.e., between 10-1 and 10-2 or between 10-3 and 10-4, cannot be performed. This is because each of the bus receivers 2-1 to 2-4 in the semiconductor integrated circuits 10-1 to 10-4 is provided with an integrating circuit which would integrate a drive pulse supplied thereto even without being differentiated, whereby a signal of a completely different waveform would be received by the bus receiver. Of course, the data transfer between semiconductor integrated circuits connected to the same bus connecting line may be enabled by providing digital receiver circuits composed of conventional TTL, CMOS, ECL, and so on in parallel with the the bus receivers 2-1 to 2-4 so as to identify a waveform of a signal supplied thereto or the type of a semiconductor integrated circuit on the transmitting side to switch processing on the received signal in accordance with the identification result.

Incidentally, the configuration of FIG. 6 may be modified, for example, such that the semiconductor integrated circuit 10-2 is not connected to the bus connecting line 1-1, or the semiconductor integrated circuit 10-3 or 10-4 is not connected to the bus connecting line 1-2. It should be noted however that, for such configurations, each end of the bus connecting lines 1-1, 1-2, to which no semiconductor integrated circuit is connected, needs to be terminated by a termination resistor for impedance matching.

Figure 7:
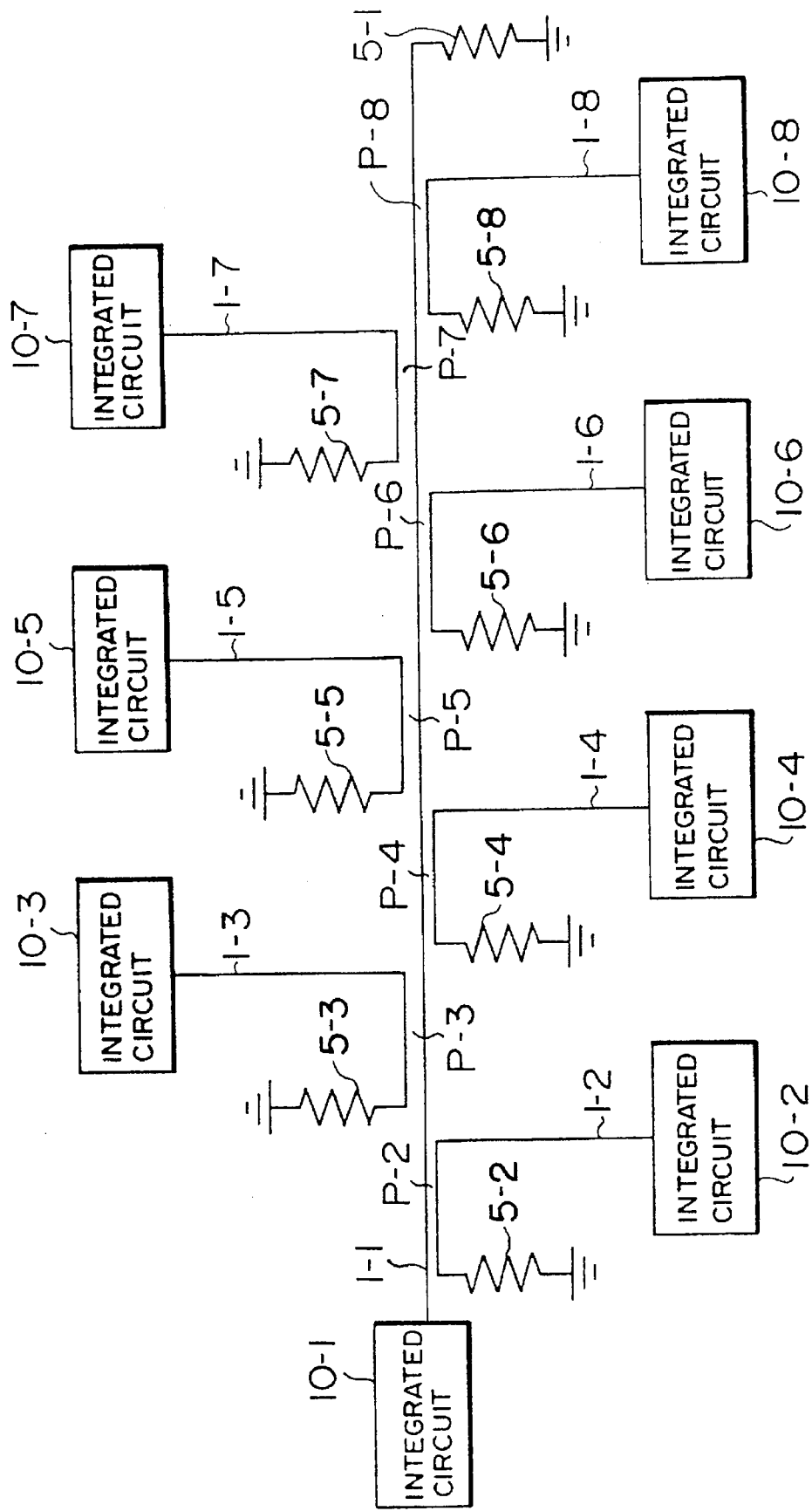
FIG. 7 is a schematic circuit diagram showing the configuration of a modified example of a non-contact bus according to the embodiment illustrated in FIG. 1.

FIG. 7 shows a modified configuration of the embodiment illustrated in FIG. 1. This non-contact bus includes, in addition to the components of FIG. 1, bus connecting lines 1-3 to 1-8; termination resistors 5-3 to 5-8; and semiconductor integrated circuits 10-3 to 10-8. Thus, in the embodiment shown in FIG. 7, eight semiconductor integrated circuits 1-1 to 1-8 are connected to the bus.

As has been explained in connection with the foregoing embodiments, a bus connecting line 1-1 is drawn from a semiconductor integrated circuit 10-1 and is terminated at the opposite end for impedance matching by a termination resistor 5-1. Similarly, bus connecting lines 1-2 to 1-8 are drawn from the remaining semiconductor integrated circuits 10-2 to 10-8, respectively, and terminated at the respective opposite ends for impedance matching by the termination resistors 5-2 to 5-8, respectively. Then, parts of these bus connecting lines 1-2 to 1-8 each having a length L are placed close to and in parallel with the bus connecting line 1-1 to form parallel coupling portions P-2 to P-8. It should be noted that in this embodiment, the transmitted signal propagation direction of the bus connecting line 1-1 is reverse to that of the remaining bus connecting lines 1-2 to 1-8.

In the configuration described above, when the semiconductor integrated circuit 10-1 transmits data, the data transmitted from the semiconductor integrated circuit 10-1 can be transferred through the respective parallel coupling portions P-2 to P-8 to the remaining semiconductor integrated circuits 10-2 to 10-8 as a differential waveform signal, similarly to the first embodiment. Likewise, when each of the semiconductor integrated circuits 10-2 to 10-8 transmits data, the data transmitted from each of the semiconductor integrated circuits 10-2 to 10-8 can be transferred through the associated one of the parallel coupling portions P-2 to P-8 to the semiconductor integrated circuit 10-1 as a differential waveform signal. Data transfer among the semiconductor integrated circuits 10-2 to 10-8 is impossible because of the operation principles, as is the case of the third embodiment, since transmitted data is differentiated twice by two parallel coupling portions. It should be pointed out that this bus connection form is suitable for a fast memory bus which is not used to transfer data between memories connected thereto, or for a system bus which does not support transfer between I/O devices.

As described above, even if the number of semiconductor integrated circuits connected to the bus is increased by extending the embodiment shown in FIG. 1, the signal propagation velocity is not slowed down by the increase of semiconductor integrated circuits because load capacitances thereof are not connected to the main line. It will therefore be appreciated that even if an increased number of loads are connected to the bus, the bus can realize stable and fast operations. Additionally, in this embodiment, since the bus connecting lines are electrically coupled in a non-contact form, and since the respective bus connecting lines 1-1 to 1-8 are terminated for impedance matching, a signal transmitted on the stubs and main line is free from multi-reflection, thus significantly reducing waveform distortion of the transmitted signal.

Figure 8:
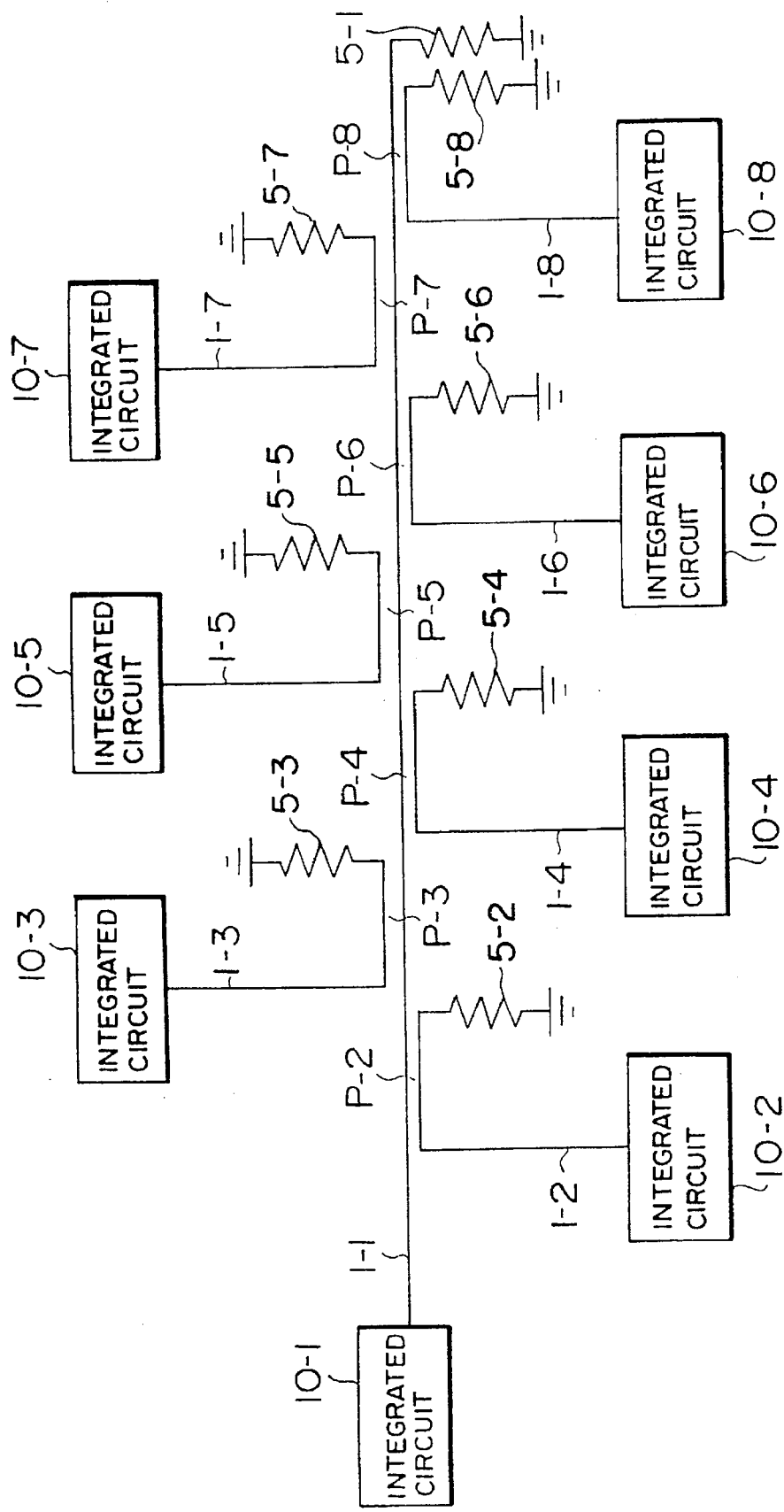
FIG. 8 is a schematic circuit diagram showing the configuration of a modified example of a non-contact bus according to the embodiment illustrated in FIG. 5.

FIG. 8 shows an example of a modified configuration of the foregoing embodiment illustrated in FIG. 5, where signals transmitted on the parallel coupling portion of the bus connecting lines propagate in the same direction. As can be seen, the configuration of FIG. 8 is completely the same as that of the embodiment shown in FIG. 7, except that the signal propagation directions are different. Therefore, this embodiment also has similar effects to the embodiment shown in FIG. 7. As will be appreciated, while the number of semiconductor integrated circuits connected to the bus is selected to be eight in the embodiments shown in FIGS. 7 and 8, the number is of course not limited to this specific value, and any arbitrary number of semiconductor integrated circuits may be connected to the bus.

Figure 9:
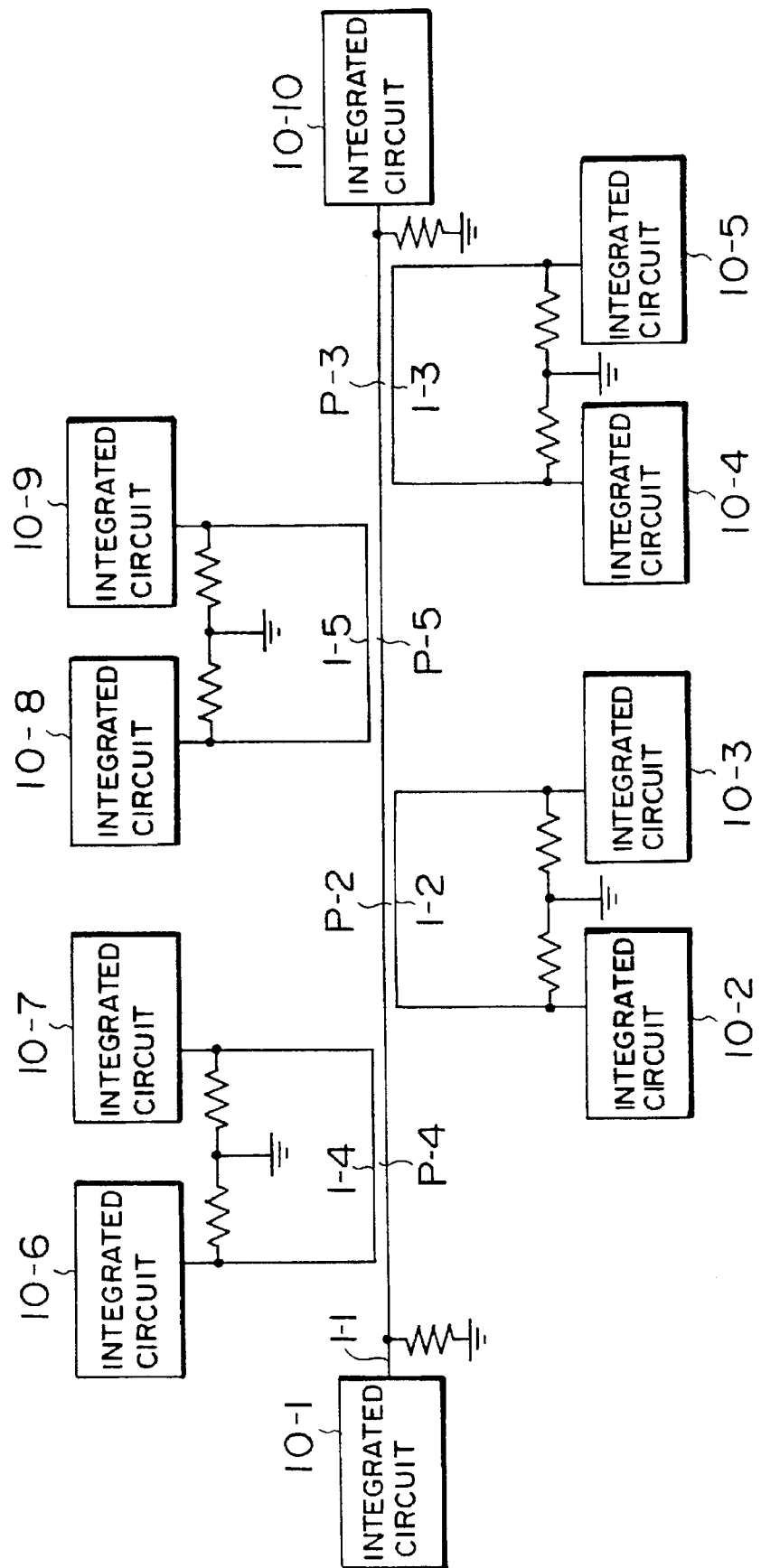
FIG. 9 is a schematic circuit diagram showing the configuration of a modified example of a non-contact bus according to the embodiment illustrated in FIG. 6.

FIG. 9 shows an example of a modified configuration of the foregoing embodiment illustrated in FIG. 6. As shown in FIG. 9, this embodiment includes ten semiconductor integrated circuits 10-1 to 10-10 connected to a bus, wherein five bus connecting lines 1-1 to 1-5 are used, the semiconductor integrated circuits 10-1 to 10-10 are connected at both ends of the respective bus connecting lines 1-1 to 1-5, and both ends of the respective bus connecting lines 1-1 to 1-5 are terminated by termination resistors for impedance matching.

This embodiment enables data transmission between the semiconductor integrated circuits 10-1, 10-10 and the semiconductor integrated circuits 10-2 to 10-9, however, data transmission between others is still impossible, as is the case of the embodiment shown in FIG. 7. While this embodiment also has similar effects to those of the embodiments shown in FIGS. 7 and 8, this embodiment is advantageous over the foregoing embodiments in that the number of bus connecting lines can be reduced if the same number of semiconductor integrated circuits are connected.

While this embodiment has been explained for the case where an even number of semiconductor integrated circuits are connected, the number of connected semiconductor integrated circuits may be odd, in which case one of them only has to be connected to a bus connecting line as shown in the embodiment of FIG. 1 or FIG. 5. Of course, the end of the bus connecting line to which no semiconductor integrated circuit is connected must be terminated by a termination resistor for impedance matching. Additionally, if the semiconductor integrated circuit 10-10 is not necessary so that data is transmitted between the semiconductor integrated circuit 10-1 and the remaining semiconductor integrated circuits 10-2 to 10-9, the end of the bus connecting line 1-1 opposite to that connected to the semiconductor integrated circuit 10-1 may be simply terminated by a termination resistor for impedance matching.

Figure 10:
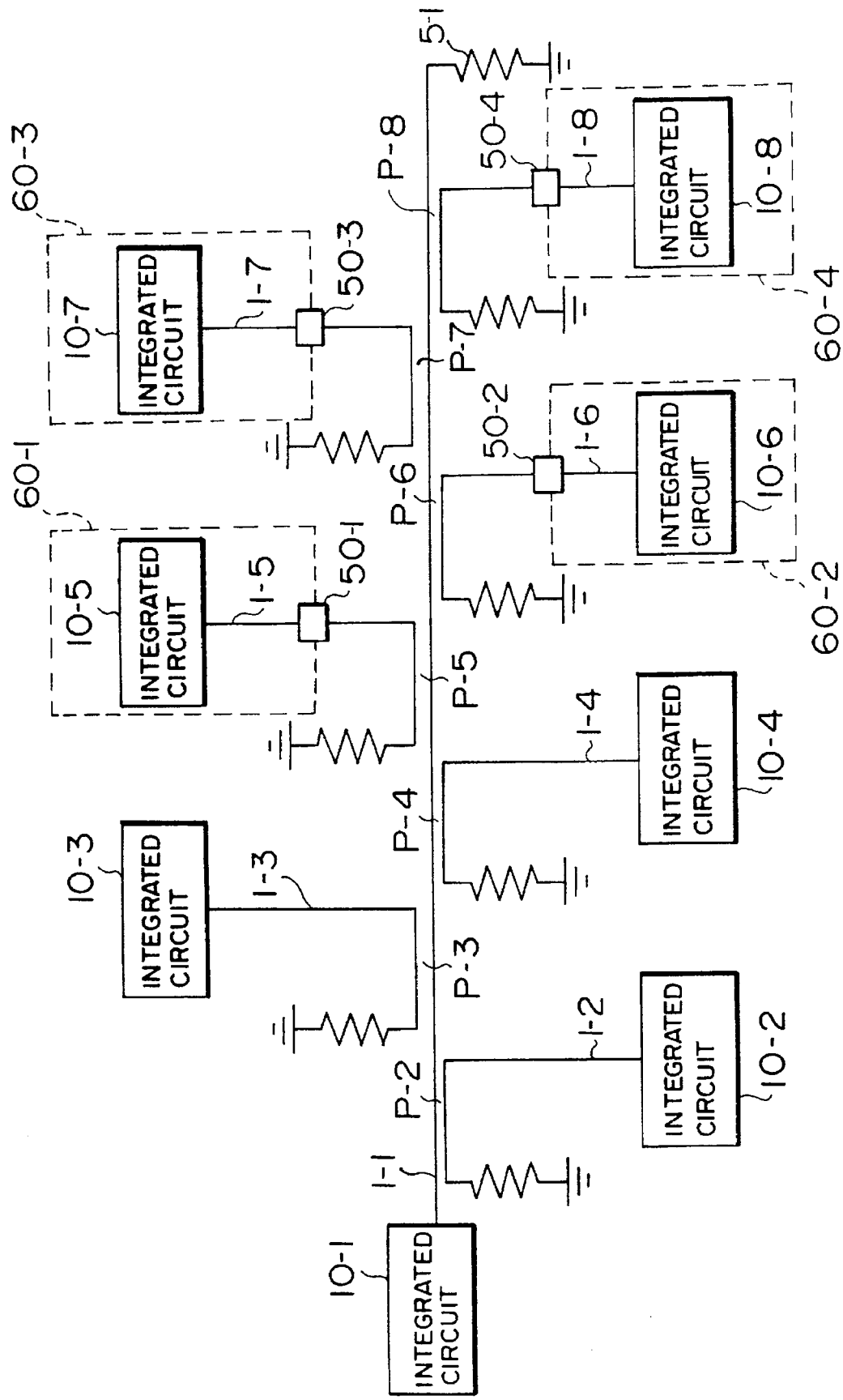
FIG. 10 is a schematic circuit diagram showing the configuration of a non-contact bus according to a modified example of the present invention.

FIG. 10 shows an example of a modified configuration of the embodiment shown in FIG. 7, which additionally includes connectors 50-1 to 50-4 and modules 60-1 to 60-4. As illustrated, semiconductor integrated circuits 10-5, 10-6, 10-7, and 10-8 are mounted in the modules 60-1, 60-2, 60-3, and 60-4, respectively, which in turn are connected to associated bus connecting lines through the connectors 50-1, 50-2, 50-3, and 50-4, respectively.

With this configuration, these modules 60-1, 60-2, 60-3, and 60-4 may be inserted into or withdrawn from the bus without disturbing a main line (bus connecting line 1-1) even if the bus is in operation. In other words, live insertion/ withdrawal is permitted. For example, when the module 60-3 is to be connected to the connector 50-3 in order to connect the semiconductor integrated circuit 10-7 to the bus during an operating state of the bus, this connection of course causes noise to occur on the bus connecting line 1-7. However, since the bus connecting line 1-7 is terminated for impedance matching, this noise will be attenuated in about a propagation time of the bus connecting line 1-7. Therefore, the noise will not repeat reflections without being attenuated, as is the case with a non-terminated bus.

Additionally, in this embodiment, since the bus connecting lines are arranged in a non-contact form, the other connected semiconductor integrated circuits are free from destruction due to static electricity or the like. The insertion of a semiconductor integrated circuit does not cause an erroneous signal to be generated on the main line, unlike conventional contact branch buses, so that a semiconductor integrated circuit may be inserted into a bus connecting line, even while data is being transferred on the same bus. Conversely, when the semiconductor integrated circuit 10-7 is to be withdrawn, the module 60-3 may be removed from the bus connecting line 1-7 during an operating state of the bus, without affecting the other semiconductor integrated circuits connected to the bus. It goes without saying that the number of connectors for the live insertion/withdrawal and their positions may be arbitrarily determined.

Figure 11:
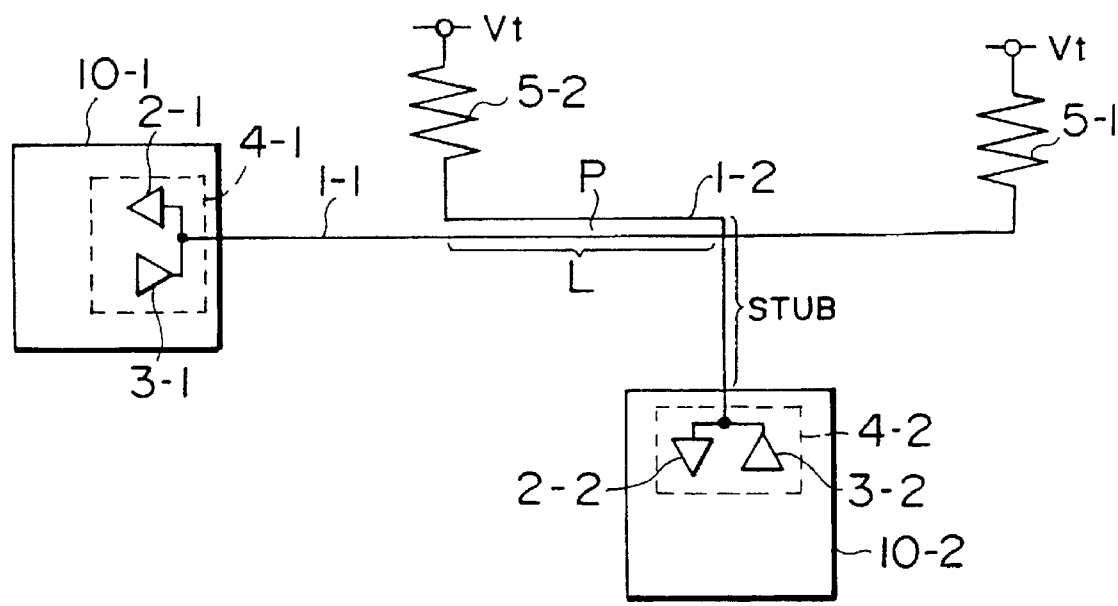
FIG. 11 is a schematic circuit diagram showing the configuration of a non-contact bus according to another embodiment of the present invention.

FIG. 11 shows the configuration according to another embodiment of the present invention, wherein termination resistors 5-1 and 5-2 are connected to a termination voltage Vt. Additionally, since bus lines 1-1, 1-2 are terminated for impedance matching by an alternate voltage, reflection of signals at their ends is prevented, as has been mentioned in the foregoing embodiments. By setting the termination voltage Vt to a voltage equal to or more than zero volts and lower by approximately 0.5 volts or more than a power supply voltage Vdd supplied to the semiconductor integrated circuit 10-1, even if the bus receiver 2 of the second embodiment is employed in the semiconductor integrated circuit, the termination voltage Vt may be used as a bias voltage for the bus receiver 2, so that a single voltage source may be connected to the bus receiver 2. Incidentally, as the matching termination means, a Thevenin termination which terminates between a power supply and a ground potential may be employed instead of the above-mentioned termination means. Further, by selecting the termination voltage Vt to be a direct current voltage of approximately one volt or more, bus drivers 3-1 and 3-2 may be formed of an open drain circuit (C-MOS semiconductor) or an open collector circuit (bipolar transistor semiconductor).

Figure 12:
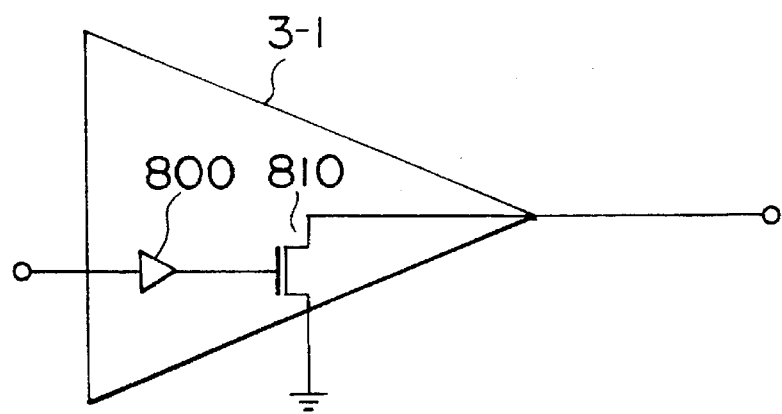
FIG. 12 is a block diagram showing a bus driver according to the embodiment illustrated in FIG. 11.

FIG. 12 shows the configuration of the bus driver 3-1 in the semiconductor integrated circuit 10-1 of this embodiment. As illustrated, the bus driver 3-1 is composed of a signal amplifier 800 and an open drain type MOS transistor 810. The open drain type MOS transistor 810 may be replaced by an open collector type bipolar transistor.

According to this embodiment, the configuration of the bus driver 3-1 can be made simpler, and by turning on and off the open drain type MOS transistor 810 in the bus driver 3-1, a high speed pulse having an amplitude equal to that of the termination voltage Vt can be generated on the bus connecting line 1-1. The bus driver may be not only of the open drain type but also of a push-pull type, although the configuration in the latter case is somewhat more complicated.

Figure 13:
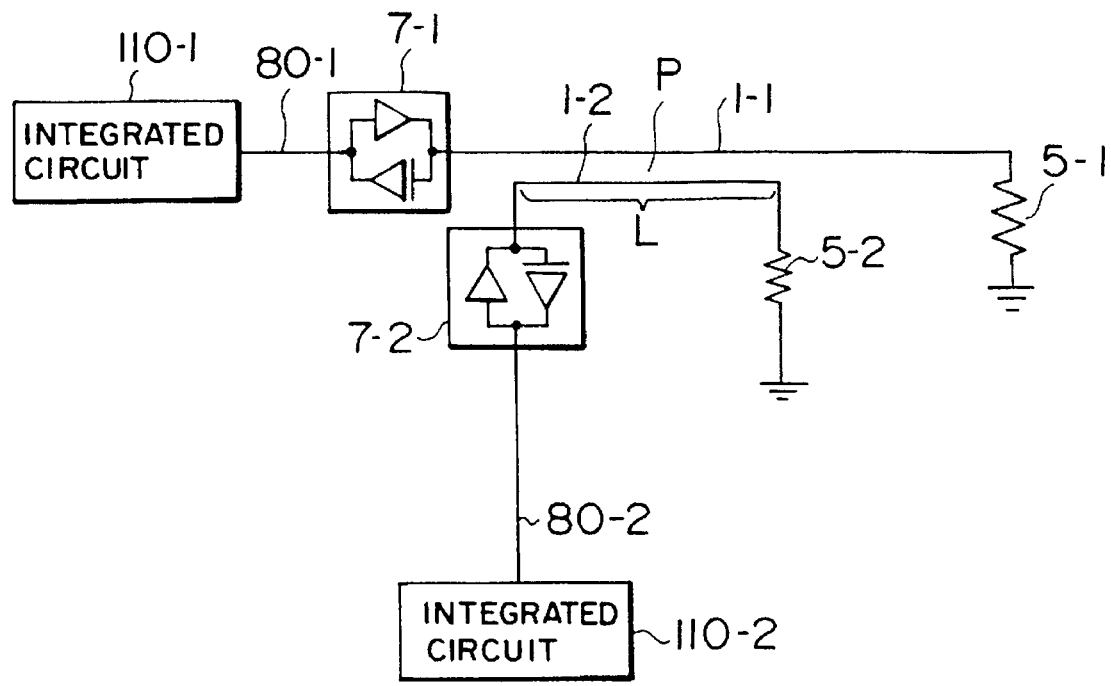
FIG. 13 is a schematic circuit diagram showing the configuration of a non-contact bus according to another embodiment of the present invention.

FIG. 13 shows the configuration of a non-contact bus according to another embodiment of the present invention. This configuration includes bus transceivers 7-1, 7-2 arranged on non-contact bus connecting lines 1-1 and 1-2, respectively; ordinary semiconductor integrated circuits 110-1, 110-2 each having a bus receiver and a bus driver which handle binary input/output voltages presenting a high (H) state and a low (L) state; and lines 80-1, 80-2 for connecting the semiconductor integrated circuits 110-1, 110-2 with the bus transceivers 7-1, 7-2, respectively. The binary input/output signals are transmitted through these lines 80-1 and 80-2.

Data transmission and reception between the semiconductor integrated circuits 110-1, 110-2 and the bus transceivers 7-1, 7-2, respectively connected through the lines 80-1, 80-2, are performed similarly to the case of ordinary semiconductor integrated circuits such as C-MOS, TTL, ECL, and so on which present binary input/output signals in the H state and L state. Data transmitted and received therebetween is transferred through the bus transceivers 7-1 and 7-2 and the bus connecting lines 1-1 and 1-2.

Figure 14:
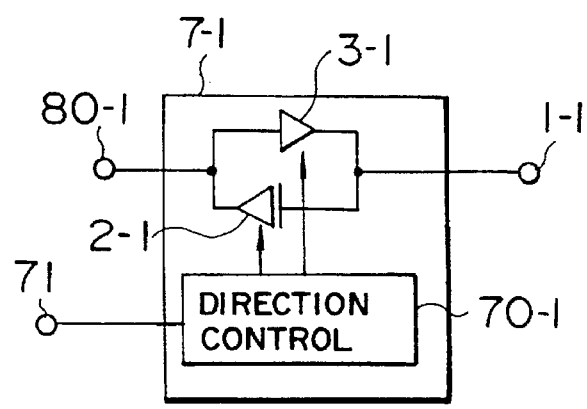
FIG. 14 is a block diagram showing the configuration of a bus transceiver according to the embodiment illustrated in FIG. 13.

FIG. 14 shows the configuration of the bus transceiver 7-1. In FIG. 14, the bus transceiver 7-1 includes a direction control circuit 70-1 for controlling a bus receiver 2-1 and a bus driver 3-1. The operation of the bus transceiver in this embodiment will be explained with reference to FIG. 14.

An input to the bus driver 3-1 is one such that has binary amplitude voltages of H state and L state, transmitted through the line 80-1. The bus driver 3-1 functions to output the signal equal to the binary input signal, applied thereto through the line 80-1, to the bus connecting line 1-1. The bus receiver 2-1 in turn functions to demodulate an input signal of a differential waveform, transmitted thereto through the bus connecting line 1-1 and deliver the demodulated signal as a binary output signal to the line 80-1.

The direction control circuit 70-1 exclusively controls the operations of the bus receiver 2-1 and the bus driver 3-1. More specifically, the direction control circuit 70-1 performs such control as to prohibit the bus receiver 2-1 from operating, while the bus driver 3-1 is being operated, and prohibit the bus driver 3-1 from operating, while the bus receiver 2-1 is being operated. Thus, data transmission and reception can be controlled with a single signal line. Additionally, if the direction control circuit 70-1 controls to prohibit both the bus receiver 2-1 and the bus driver 3-1 from operating, a faulty semiconductor integrated circuit 110-1 can be electrically cut off from the bus connecting line 1-1. In this way, the use of the bus transceivers 7-1, 7-2 allows a semiconductor integrated circuit having a conventional binary input/output signal circuits to be connected to a non-contact bus line.

Figure 15:
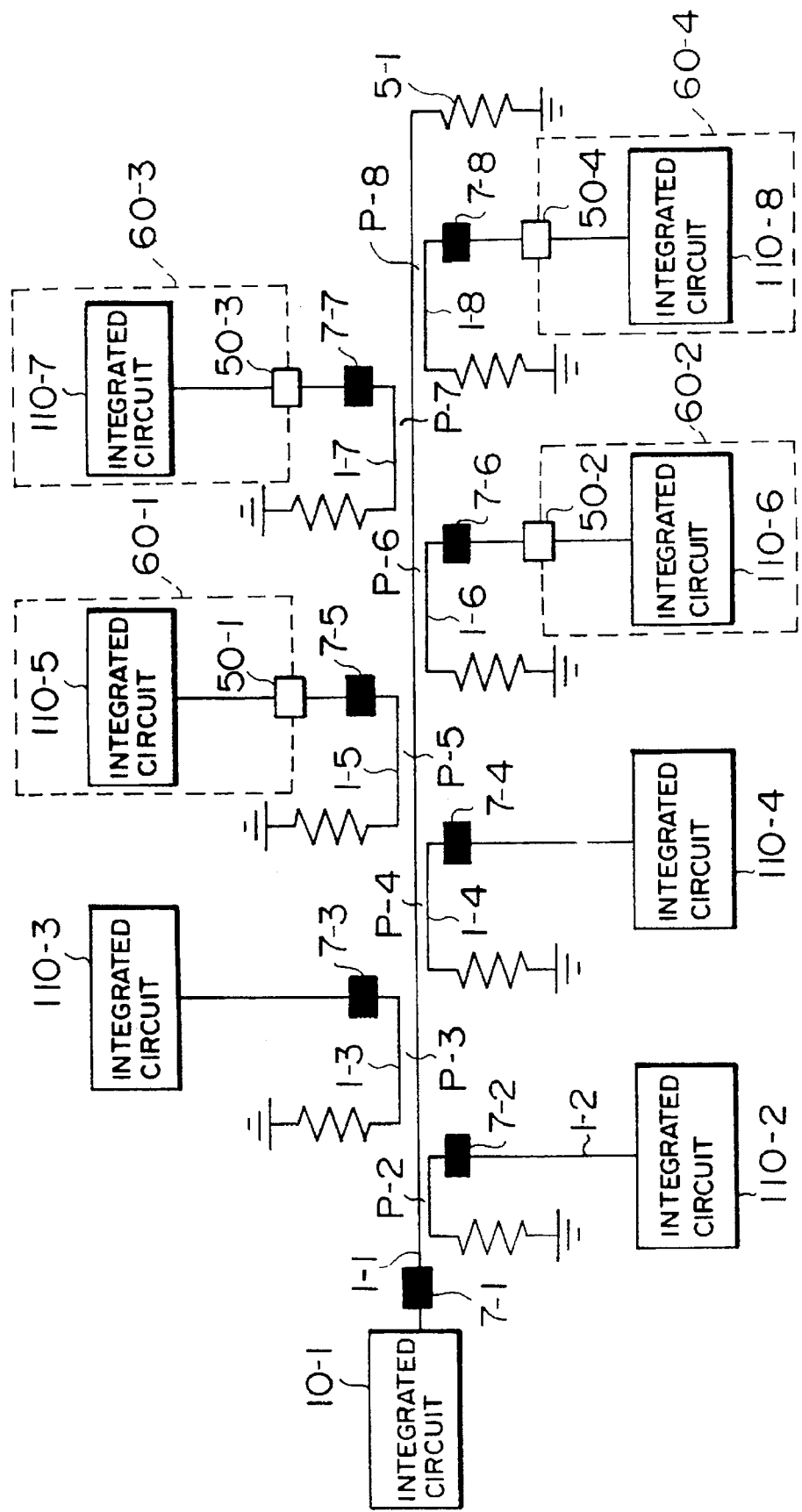
FIG. 15 is a schematic circuit diagram showing the configuration of a non-contact bus according to another embodiment of the present invention.

FIG. 15 shows the configuration of another embodiment according to the present invention. This configuration includes semiconductor integrated circuits 110-3 to 110-8 each having a conventional binary bus driver; and bus transceivers 7-1 to 7-8.

The semiconductor integrated circuits 110-1 to 110-8 are connected to the bus transceivers 7-1 to 7-8, respectively, so that data formed of ordinary binary signals is transmitted and received between a semiconductor integrated circuit and an associated bus transceiver. Then, among the bus transceivers 7-1 to 7-8, data transmission and reception are carried out through non-contact bus lines. By thus employing the bus transceivers 7-1 to 7-8, non-contact bus lines can be constituted using semiconductor integrated circuits each having a conventional binary input/output signal circuit, and fast transfer of a transmitted signal and live insertion/withdraw can be readily realized.

Figure 16:
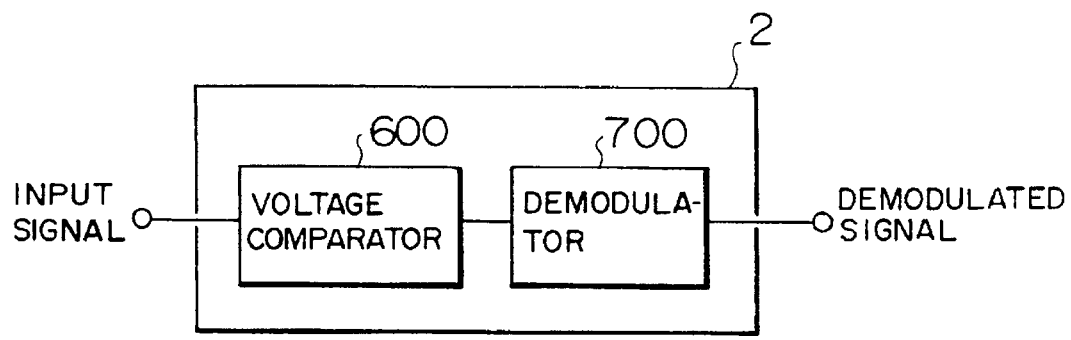
FIG. 16 is a block diagram showing an exemplary internal configuration of a bus receiver in an embodiment of the present invention.

FIG. 16 shows the internal configuration of the bus receiver 2-1 or 2-2 in the semiconductor integrated circuit 10-1 or 10-2 connected to the non-contact bus. The bus receiver 2 in the semiconductor integrated circuit 10 connected to a non-contact bus line is composed of a voltage comparator unit 600 and a demodulator 700. A signal input to the bus receiver 2 presents a differential waveform of an original rectangular signal transmitted through the non-contact bus. The voltage comparator unit 600 detects a peak voltage of the input signal by comparing the differential waveform signal with a reference voltage, and the detected peak voltage is demodulated to the original rectangular waveform by the demodulator 700.

Figure 17A:
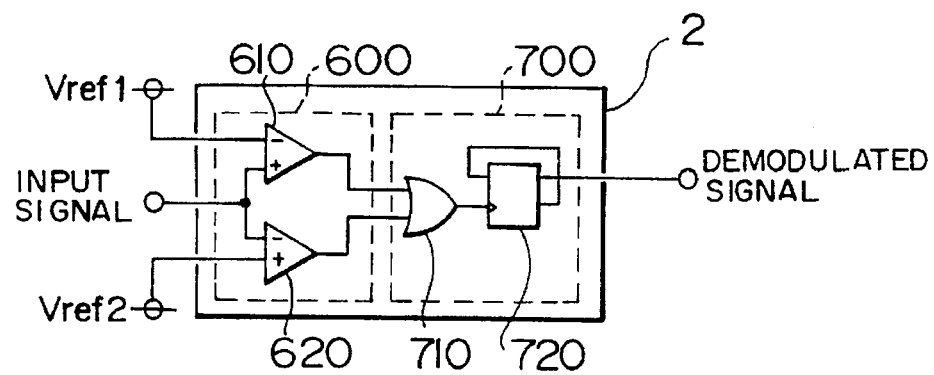
FIGS. 17A and 17B are logic circuit diagrams each showing in detail the bus receiver illustrated in FIG. 16.
Figure 17B:
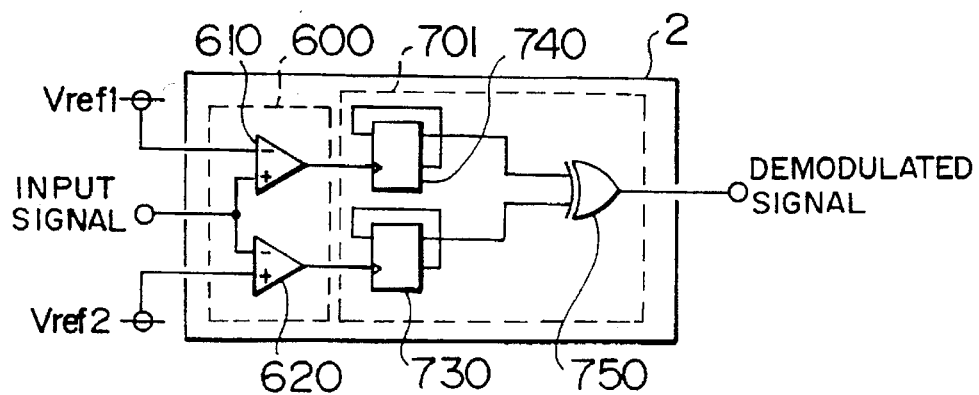

FIGS. 17A and 17B show in block diagram form specific details of the bus receiver 2 in the semiconductor integrated circuit 10. Referring first to FIG. 17A, the voltage comparator unit 600 includes voltage comparators 610 and 620 which compare an input signal voltage with reference voltages Vref1 and Vref2, respectively, and output their comparison results. The demodulator 700 includes a logic OR circuit 710 and a frequency divider 720, where the logic OR circuit 710 combines the outputs of the voltage comparators 610 and 620, and the frequency divider 720 demodulates the combined signal.

Figure 18:
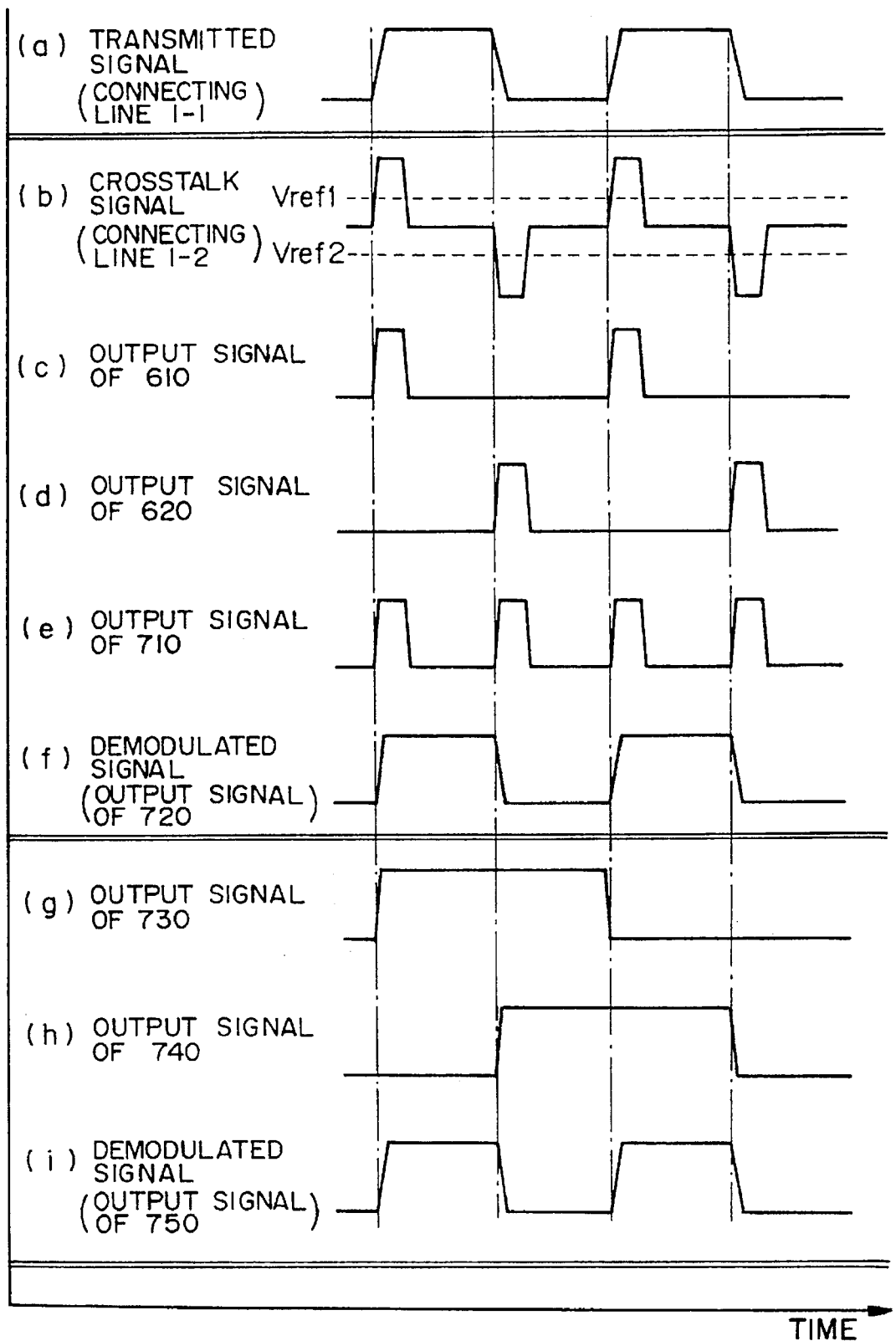
FIG. 18 shows waveform charts of signals on a non-contact bus according to an embodiment of the present invention which employs the bus receivers illustrated in FIGS. 17A and 17B.

The operations of the respective elements in the bus receiver 2 will be explained with reference to FIG. 18. It should be noted that signal delays caused by respective circuit elements are regarded to be negligible. In FIG. 18, a waveform chart (a) shows a rectangular waveform of data transmitted from the semiconductor integrated circuit 10 connected to the bus, i.e., the waveform of a signal transmitted on the bus connecting line 1-1. A waveform chart (b) shows a waveform of a crosstalk signal on the bus connecting line 1-2 which presents in this case a differential waveform of the transmitted data waveform (a). This crosstalk signal (b) is input to the bus receiver 2 shown in FIG. 17A. The voltage comparators 610 and 620 respectively compare the crosstalk signal (b) with the reference voltages Vref1 and Vref2 indicated by broken lines in FIG. 18(b), and deliver output signals of waveforms shown in (c) and (d), respectively. The logical OR circuit 710 combines these signals to convert them to an output signal having a pulse train shown in (e). The frequency divider 720 divides the signal (e) to produce a demodulated signal (f) which presents the perfectly restored original signal (a) transmitted from the semiconductor integrated circuit 10.

The bus receiver 2, when configured as shown in FIG. 17B, can also demodulate a transmitted signal similarly to that shown in FIG. 17A. Referring in detail to FIG. 17B, the voltage comparator unit 600 is the same as that shown in FIG. 17A, while a demodulator 701 is composed of two frequency dividers 730, 740 and an exclusive OR logic 750.

The operations of the respective elements in FIG. 17B will be explained with reference to FIG. 18.

The demodulator 701 receives signals (c) and (d) of FIG. 18 as input signals, and the frequency dividers 730 and 740 respectively divide the pulse train signals (c) and (d) to output signals shown in (g) and (h), respectively. Then, the exclusive OR logic 750 detects discrepant portions of the signals (g) and (h), and demodulates these signals to a signal shown in (i). The waveform of the demodulated signal is the same as that of the demodulated signal (f) by the bus receiver 2 shown in FIG. 17A. It will be thus appreciated that the transmitted signal can be perfectly restored also by employing the bus receiver 2 shown in FIG. 17B. When the bus receiver 2 is configured as in this embodiment, a bias voltage source is required for operating the voltage comparator unit 600. Of course, input/output signals may be either of positive and negative logic.

In this embodiment, by employing the stable reference voltages Vref1, Vref2, an accurate bus receiver can be readily created even if C-MOS semiconductor devices and bipolar transistor semiconductor devices, which exhibit large variations due to the manufacturing, are used as circuit elements.

Figure 19A:
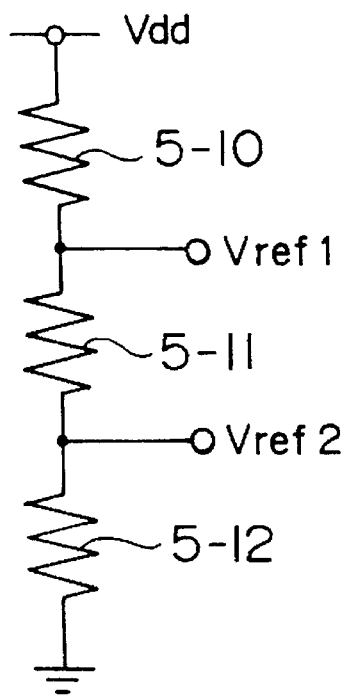
FIGS. 19A and 19B are circuit diagrams showing reference voltage generators for the bus signal input circuits illustrated in FIGS. 17A and 17B, respectively.
Figure 19B:
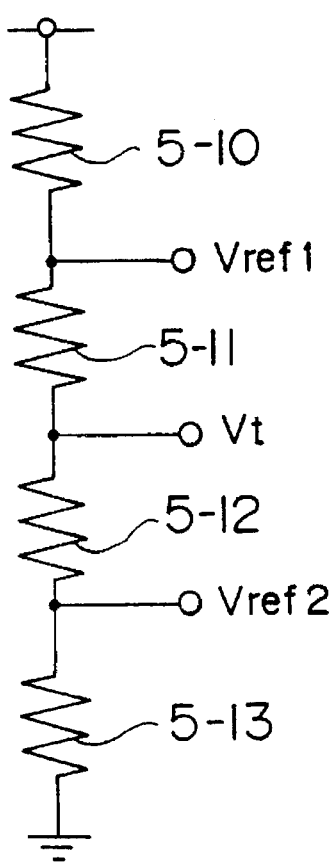

FIG. 19A and 19B respectively show a reference voltage generator for Vref1, Vref2. The reference voltage generator shown in FIG. 19A includes three voltage dividing resistors 5-10 to 5-12, while that shown in FIG. 19B includes four such resistors 5-10 to 5-13. The reference voltages Vref1, Vref2 may be readily produced by dividing a voltage between a power supply voltage Vdd supplied to the semiconductor integrated circuit 10 and the ground potential with three or four dividing resistors. By appropriately combining these resistors 5-10 to 5-13, the reference voltages Vref1, Vref2 having arbitrary values between zero volts to the power supply voltage Vdd can be produced at a high rate of accuracy. As will be appreciated, the respective bus receivers 2 described above in this embodiment may be applied to all the foregoing embodiments completely in the same way.

Figure 20:
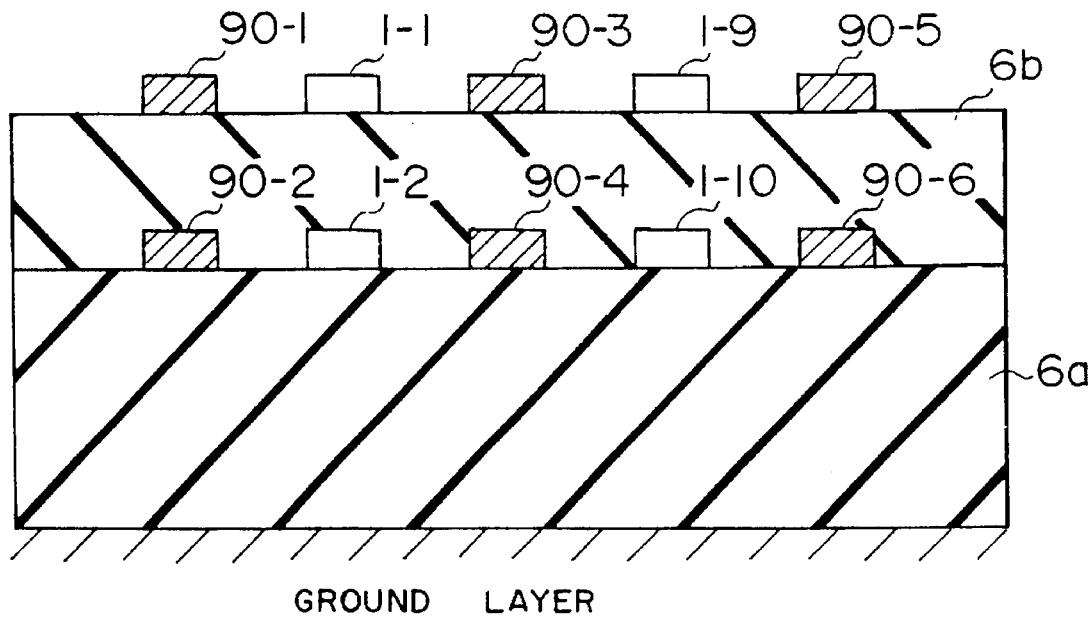
FIG. 20 is a cross-sectional view showing an exemplary arrangement in a parallel coupling portion of a non-contact bus in an embodiment of the present invention.

FIG. 20 shows in a cross-sectional view an exemplary configuration of bus connecting lines in an embodiment of the present invention. The configuration of FIG. 20 includes multi-layer printed circuit boards 6a, 6b constituting a non-contact bus; bus connecting lines 1-9, 1-10; and printed grounded lines 90-1 to 90-6. The bus connecting lines 1-1 and 1-2 or the bus connecting lines 1-9 and 1-10 shown in FIG. 20 are portions which constitute the parallel coupling portion P of the non-contact bus explained in connection with the foregoing embodiments. These bus connecting lines 1-1, 1-2 or 1-9, 1-10 are respectively arranged at the same position on upper and lower different layers of the multi-layer printed circuit board 6. Further, they are spaced by a constant interval so that they extend in parallel with each other. These bus connecting lines, though not contacting with each other, are electrically coupled, as described above. The surface layer 6b of the multi-layer printed circuit board 6 is made, for example, of glass-epoxy resin and serves as a means for holding constant the interval between the bus connecting lines 1-1 and 1-2, and the interval between the bus connecting lines 1-9 and 1-10.

The printed grounded lines 90-1 to 90-4 are arranged so as to surround the bus connecting lines 1-1 and 1-2, and both ends of these lines 90-1 to 90-4 are grounded. It should be noted that in FIG. 20, portions having the ground potential are indicated by shading. These printed grounded lines 90-1 to 90-4 can reduce electric coupling of a parallel coupling portion P of non-contact bus line pair to an adjacent parallel coupling portion of another non-contact bus line pair, for example, electric coupling of the bus connecting line pair 1-1, 1-2 from the bus connecting line pair 1-9, 1-10. Consequently, this leads to reducing noise which would otherwise be generated mutually in the non-contact bus line pairs, thus making it possible to configure a highly reliable bus.

Figure 21:
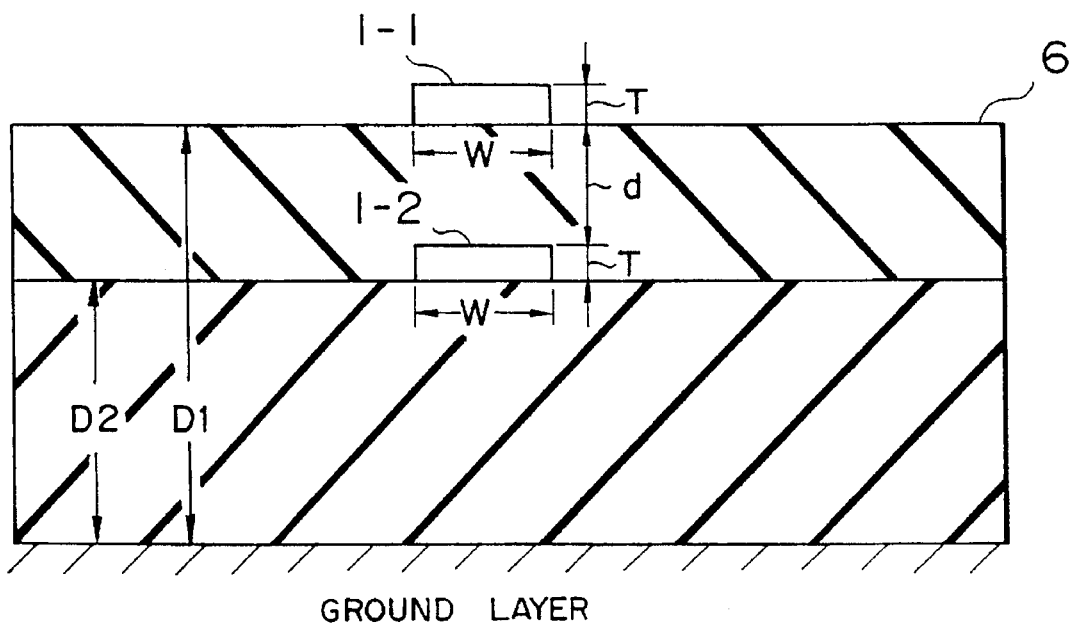
FIG. 21 is a cross-sectional view showing examples of specific dimensions of the non-contact bus according to the example illustrated in FIG. 20.
Figure 22:
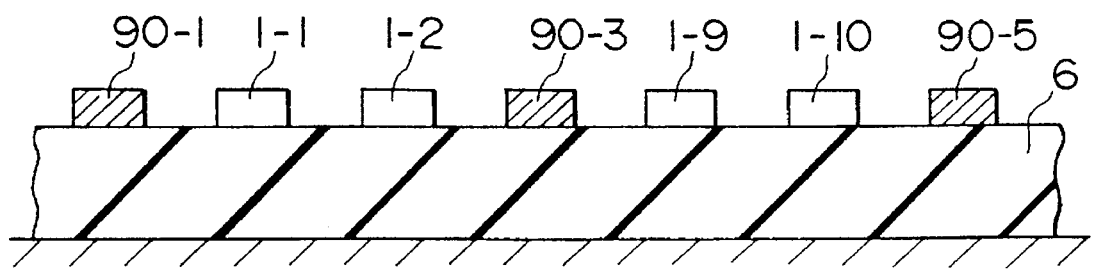
FIG. 22 is a cross-sectional view showing a modified example of the parallel coupling portion of the non-contact bus in an embodiment of the present invention.
Figure 23A:
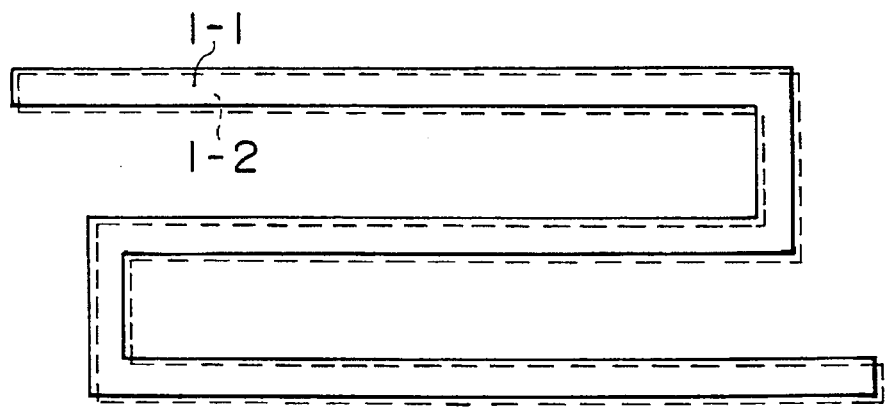
FIGS. 23A and 23B are planar views showing modified examples of the parallel coupling portion of the non-contact bus in an embodiment of the present invention.
Figure 23B:
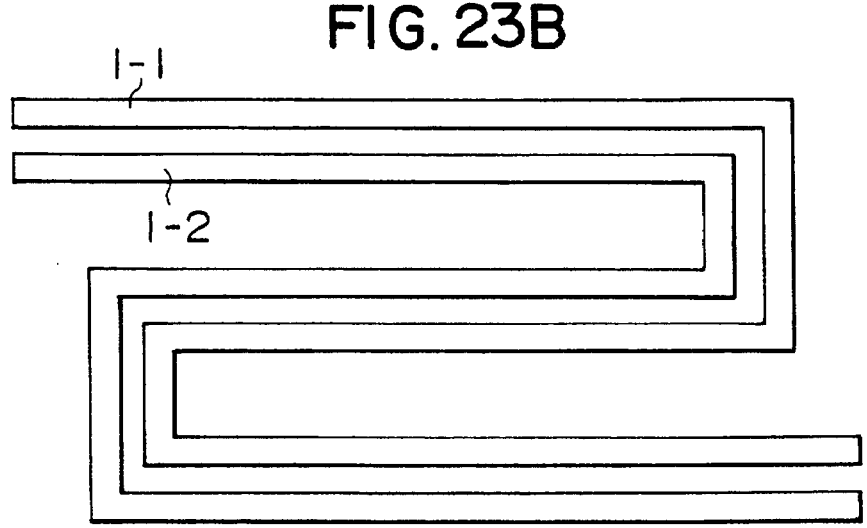

FIG. 21 shows in a cross-sectional view an exemplary configuration of a specific bus connecting lines of this embodiment. In the example of FIG. 21, the bus connecting lines 1-1 and 1-2 each have a width W of 200 mm and a thickness T of 10 mm. A distance from a ground layer to the bottom surface of the bus connecting line 1-1 is 600 mm, while a distance from the ground layer to the bottom surface of the bus connecting line 1-2 is 400 mm. From these specific values, the interval d between the bus connecting lines 1-1 and 1-2 in the parallel coupling portion P is calculated to be 190 mm. The length L of the parallel coupling portion P is 15 cm. Additionally, the dielectric constant of the printed circuit board 6 is 4.5. Alternatively, the bus connecting lines may be arranged on the same surface as shown in FIG. 22. Also, while the parallel coupling portion P is generally formed in a linear shape, a two-layer zig-zag patterned parallel coupling portion as shown in FIG. 23A or a parallel coupling portion of zig-zag pattern formed on the same surface may be formed. When the parallel coupling portion P is patterned as shown in FIGS. 23A and 23B, its area can be reduced on the surface of the printed circuit board.

Figure 24A:
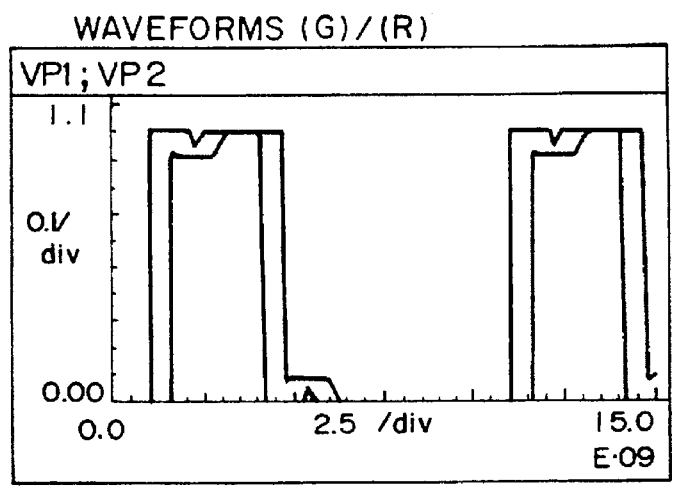
FIGS. 24A, 24B and 24C show waveform charts of crosstalk signals generated on a non-contact bus in an embodiment of the present invention.
Figure 24B:
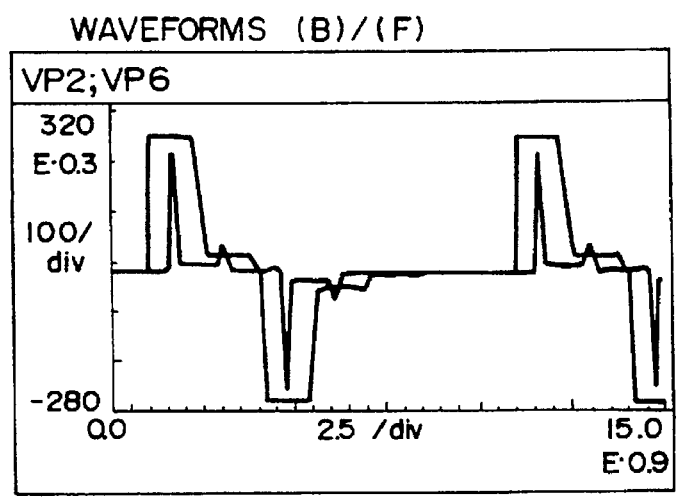
Figure 24C:
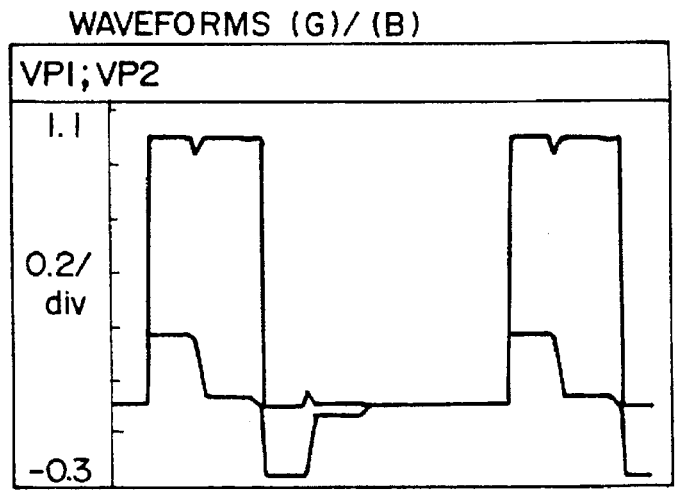

FIGS. 24A to 24C are graphs showing waveforms of crosstalk signals generated at respective ends of the parallel coupling portion of the specific example described above. The graphs shown in FIGS. 24A to 24C are the results obtained by making an electromagnetic field analysis on the non-contact bus lines of the foregoing specific example and generating waveforms of crosstalk signals by simulative experiments. In the experiments, a rising/falling time T1 was set to 1 nsec.

Specifically, FIG. 24A shows waveforms of signals at (G) and (R) points of the aforementioned bus connecting line 1-1; FIG. 24B waveforms of crosstalk signals generated at (B) and (F) points on the bus connecting line 1-2; and FIG. 24C the waveform of the signal at the point (G) on the bus connecting line 1-1 and the waveform of the crosstalk signal generated at the point (B) on the bus connecting line 1-2. As can be seen from FIGS. 24A to 24C, the non-contact bus lines of this specific example can generate backward and forward crosstalk signals having amplitudes of 0.22 volts and 0.28 volts, respectively, by transferring a transmitted signal having an amplitude of one volt. In this way, the non-contact bus lines according to the present invention can be readily implemented by using a printed circuit board which is relatively easily manufactured.

Figure 25:
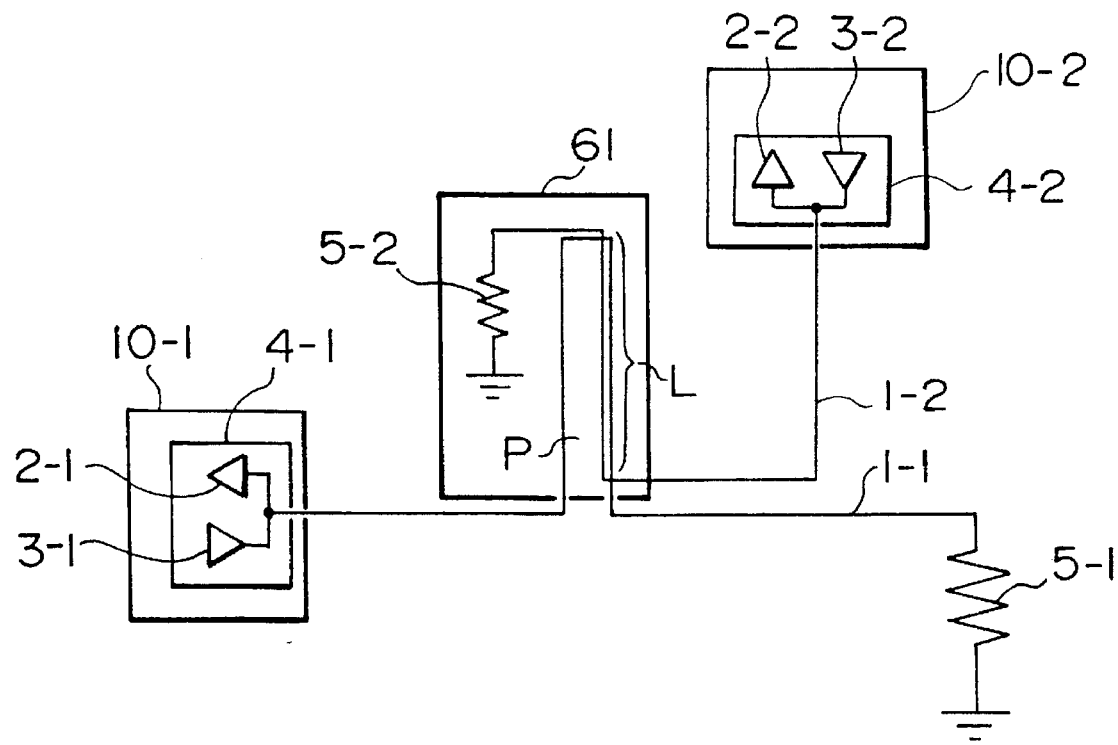
FIG. 25 is a cross-sectional view showing an exemplary configuration of bus connecting lines in an embodiment of the present invention.
Figure 26:
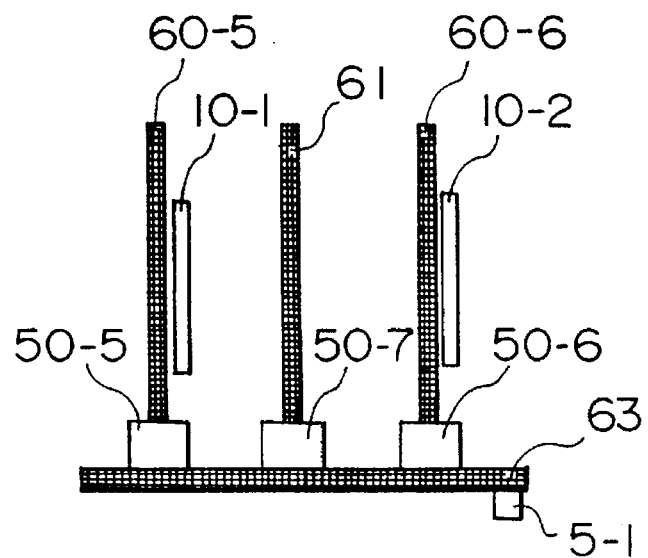
FIG. 26 is a front view showing an example of a printed circuit board including bus connecting lines in an embodiment of the present invention.

Next, explanation will be given of another embodiment of the present invention which provides a parallel coupling portion independently of a main printed circuit board in order to reduce the size of the main printed circuit board. FIG. 25 shows in a cross-sectional view an exemplary configuration of bus connection lines according to the present invention, and FIG. 26 shows a front view of a printed circuit board including the bus connecting lines. In these drawings, a parallel coupling board 61 includes a parallel coupling portion P of a length L having bus connecting lines 1-1 and 1-2 opposed in parallel with each other, and a main printed circuit board 63 is provided with a multiplicity of connectors for a memory bus, a back plane bus, or the like. The parallel coupling board 61 is formed of an independent circuit board similar to that shown in FIG. 20 or 22, on which mounted are circuit elements including the parallel coupling portion P consisting of bus connecting lines according to the embodiment of the present invention. The parallel coupling board 61 is connected with circuit lines on the main printed circuit board 63 through a connector 50-7. The circuit boards 60-5 and 60-6 shown in FIG. 26 are printed circuit boards respectively having semiconductor integrated circuits 10-1 and 10-2 mounted thereon, and are connected with circuit lines on the main printed circuit board 63 through connectors 50-5 and 50-6, respectively. Thus, the operation of the circuit including the bus connecting lines is completely the same as that of the foregoing embodiments so far described. Additionally, the characteristic impedance of the bus connecting lines constituting the parallel coupling portion P on the parallel coupling board 61 is the same as that of other circuit lines.

Assuming, for example, that a signal is transmitted from the semiconductor integrated circuit 10-1 to the semiconductor integrated circuit 10-2, the signal is transferred from the semiconductor integrated circuit 10-1 through the circuit board 60-5 and the connector 50-5 to the main printed circuit board 63, further transferred through the circuit lines on the main printed circuit board 63 and the connector 50-7 to the bus connecting line 1-1 in the parallel coupling board 61, and then reaches a termination resistor 5-1 through the connector 50-7 and the circuit lines on the main printed circuit board 63, without suffering any substantial waveform distortion. The signal is attenuated by the termination resistor 5-1 without being reflected. A crosstalk signal generated on the bus connecting line 1-2 in the parallel coupling portion on the parallel coupling board 61 is transferred to the semiconductor integrated circuit 10-2 through the connector 50-7, circuit lines on the main printed circuit board 63, the connector 50-6, and the circuit board 60-6. As described above, the crosstalk signal is demodulated by a bus receiver 2-2 in the semiconductor integrated circuit 1-2 to be a logic signal.

Thus, in this embodiment, since circuit lines constituting the parallel coupling portion and having a length necessary for the signal propagation between the bus connecting lines 1-1 and 1-2 is formed on a circuit board independently of the main printed circuit board 63, the line density on the circuit boards can be reduced as compared to the case where these circuit lines are also formed on the main printed circuit board 63. It is therefore possible to reduce the size of the entire circuit configuration as well as a line design cost and a board manufacturing cost. Incidentally, the termination resistor 5-1 may be placed at any position as long as it is on the opposite surface to the surface on which the semiconductor integrated circuit 10-1 is mounted. Further, the respective circuit boards implanted on the main printed circuit board 63 may be mounted on both surfaces of the main printed circuit board 63.

Figure 27:
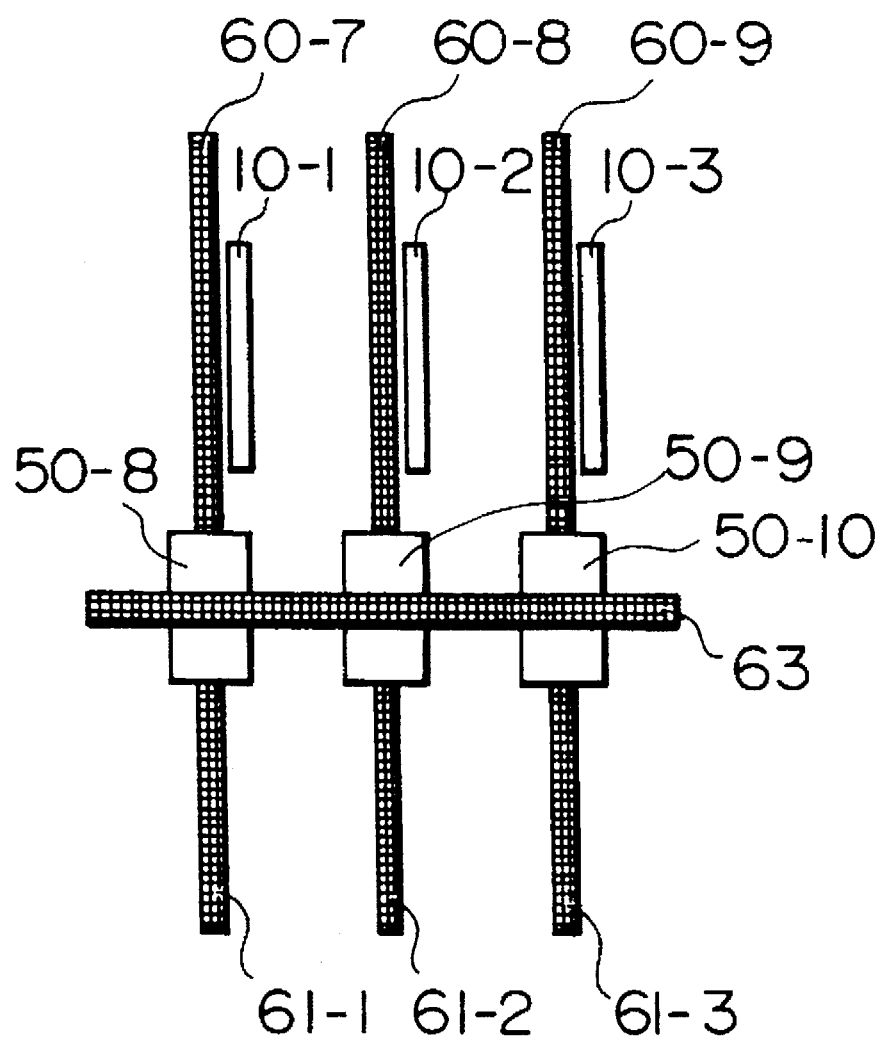
FIG. 27 is a front view showing a modified example of the printed circuit board illustrated in FIG. 26.

FIG. 27 shows a front view of a printed circuit board according to a modified example of the foregoing embodiment, wherein circuit boards 60-7, 60-8, and 60-9 respectively having semiconductor integrated circuits 10-1, 10-2, and 10-3 mounted thereon are vertically connected through connectors 50-8, 50-9, and 50-10 on one side of a main printed circuit board 63, while parallel coupling boards 61-1, 61-2, and 61-3 are vertically connected through the connectors 50-8, 50-9, and 50-10 on the other side of the main printed circuit board 63. In this way, the mounting of circuit boards on both surfaces of the main printed circuit board 63 results in further enhancing the mounting density of circuit boards. The connectors 50-8, 50-9, and 50-10 may be of a board penetrating type or a surface mounted type.

As will be appreciated, the present invention is not limited to the embodiments so far described, but may be implemented by any combination of those embodiments. For example, when a plurality of semiconductor integrated circuits 10 are connected to a bus, part of the semiconductors 10 may be connected to a bus connecting line 1-1 such that the signal propagation directions are reverse to each other as shown in FIG. 7, while the remaining semiconductor integrated circuits 10 may be connected to the bus connecting line 1-1 such that all signals propagate in the same direction as shown in FIG. 8. Alternatively, the configuration shown in FIG. 9 may be added. Further alternatively, as shown in FIG. 10, the semiconductor integrated circuits 10 may be connected to the bus connecting line 1-1 through connectors 50.

As described above, according to the present invention, a plurality of bus connecting lines, each having a signal processing means including a bus receiver having an integrating circuit connected at one end thereof, have the ends opposite to those connected to the signal processing means terminated for providing impedance matching, one of the bus connecting lines is arranged close to and in parallel with part of at least one of the other bus connecting lines in a non-contact manner to form a non-contact parallel coupling portion, so that no multi-reflection occurs on a main line or stubs, thus significantly reducing waveform distortion of transmitted signals. Additionally, since no load capacitance is directly connected to the main line, the signal propagation velocity can be prevented from slowing down, and the bus can be stably operated at a high speed, irrespective of the number of signal processing means connected to the bus.

Since signal processing means are connected to both ends of at least one bus connecting line, and both ends thereof are terminated for impedance matching, the number of lines constituting the bus connecting lines can be reduced, thus providing a smaller bus configuration.

Since the bus receiver in the bus transceiver is composed of a voltage comparator and a demodulator, a highly accurate bus receiver can be readily created by using a regulated power supply, even if cheap C-MOS semiconductor devices and bipolar transistor semiconductor devices are employed as circuit elements.

Since signals output from signal processing means connected to bus connecting lines forming a parallel coupling portion propagate in the same direction, the length of the parallel coupling portion may be arbitrarily determined in a predetermined range, thus increasing the freedom in designing the bus.

Since bus connecting lines constituting a parallel coupling portion are formed of two adjacent lines on a printed circuit board or two lines adjacent in the stacking direction of a multi-layer printed circuit board, the bus connecting lines can be readily manufactured at a low cost by using ordinary printed wiring techniques.

Since an open drain type MOS transistor is employed for a bus driver in a bus transceiver, the bus driver is excellent in regards to response characteristics.

Since a bus receiver included in a signal processing means is formed separately from a signal processing circuit itself dedicated to signal processing, the signal processing means composed of ordinary semiconductor circuits such as C-MOS, TTL, ECL, and so on can be connected as it is to a bus connecting line without providing an additional bus transceiver.

Bus connecting lines constituting a parallel coupling portion are formed of two vertically adjacent lines arranged on upper and lower layers of a multi-layer printed circuit board, and grounded lines are provided in parallel with them, such that these grounded lines sandwich the bus connecting lines on both sides in a direction different from the direction in which the bus connecting lines oppose each other, thus weakening electric coupling between bus connecting line pairs constituting different parallel coupling portions, whereby a highly reliable bus can be configured.

Since a bus connecting unit, including bus connecting lines constituting a signal transmission section and termination resistors each for terminating at least one end of each of the bus connecting lines for impedance matching, is formed of an independent printed circuit board, a circuit board unit made up of a printed circuit board including the signal transmission section and other printed circuit boards can be manufactured in a compact size and at a low cost. Additionally, the mounting density of the printed circuit board can be enhanced.

Since at least one signal processing means is connected to a bus connecting line through a connector, live insertion/withdrawal can be applied to the signal processing means.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

What is claimed:

1. A fast data transfer bus, comprising:

first and second bus connecting lines each for transferring a data pulse signal;

a first bus transceiver connected to one end of said first bus connecting line;

a first termination resistor connected to the other end of said first bus connecting line for impedance matching;

a second bus transceiver connected to one end of said second bus connected line;

a second termination resistor connected to the other end of said second bus connecting line for impedance matching; and a supporting member for holding substantially constant an interval between said first and second bus connecting lines over a parallel coupling portion of a predetermined length of said first and second bus connecting lines for producing capacitive and inductive coupling between both of said bus connecting lines, said supporting member having a ground layer provided on one side of said first and second bus connecting lines so as to be spaced therefrom through an insulating material, wherein each of said first and second bus transceivers includes a bus driver and a bus receiver, and wherein further a bus receiver in one of said bus transceivers generates a pulse signal substantially equal to an output pulse signal which was generated by a bus driver in the other of said bus transceivers, based on forward crosstalk induced by said output pulse signal at said parallel coupling portion on a bus connecting line which is connected to said one bus transceiver, and at said parallel coupling portion on said first and second bus connecting lines, a direction from said first bus transceiver to said first termination resistor is reverse to a direction from said second bus transceiver to said second termination resistor.

2. A bus according to claim 1, wherein said bus receiver includes an analog integrating circuit for generating a single pulse signal substantially equal to said output pulse in response to two sequential pulse waveforms of opposite polarities induced in said parallel coupling portion on a bus connecting line which is directly connected to an associated bus transceiver.

3. A bus according to claim 1, wherein said bus receiver includes:

a first comparator for directly receiving a first one of two sequential pulse waveforms of opposite polarities induced in said parallel coupling portion on the bus connecting line, which is directly connected to the associated bus transceiver, to compare said first one voltage to output a pulse;

a second comparator for directly receiving a second pulse waveform of said two sequential pulse waveforms, to compare said second pulse waveform with a second reference voltage to output a pulse; and a frequency divider for receiving said pulses from said first and second comparators and generating a single pulse signal substantially equal to said output pulse.

4. A fast data transfer bus comprising:

first and second bus connecting lines each for transferring a data pulse signal;

a first bus transceiver connected to one end of said first bus connecting line;

a first termination resistor connected to the other end of said first bus connecting line for impedance matching;

a second bus transceiver connected to one end of said second bus connecting line;

a second termination resistor connected to the other end of said second bus connected line for impedance matching; and a supporting member for holding substantially constant an interval between said first and second bus connecting lines over a parallel coupling portion having a predetermined length of said first and second bus connecting lines for producing capacitive and inductive coupling between both of said bus connecting lines, wherein each of said first and second bus transceivers includes a bus driver and a bus receiver, and the bus receiver in one of said bus transceivers generates a pulse signal substantially equal to an output pulse signal which was generated by a bus driver in the other of said bus transceivers, based on a pulse waveform induced by said output pulse signal in said parallel coupling portion on the bus connecting line which is connected to said one bus transceiver, wherein said bus receiver includes:

a first comparator for comparing a first pulse waveform of two sequential pulse waveforms of opposite polarities induced in said parallel coupling portion on a bus connecting line, which is directly connected to an associated bus transceiver, with a first reference voltage to output a pulse, a second comparator for comparing a second pulse waveform of said two sequential pulse waveforms with a second reference voltage to output a pulse, a first frequency divider connected to said first comparator, a second frequency divider connected to said second comparator, and logic means for taking exclusive OR of outputs from said first and second frequency dividers to generate a single pulse signal substantially equal to said output pulse.

5. A bus according to claim 1, wherein said first and second termination resistors are connected to a ground potential.

6. A bus according to claim 1, wherein said first and second termination resistors are connected to a potential equal to or less than a power supply voltage applied to said first and second bus transceivers.

7. A bus according to claim 6, wherein said bus driver includes an open drain type MOS transistor having its drain terminal connected to a bus connecting line which is directly connected to an associated bus transceiver.

8. A bus according to claim 6, wherein said bus driver includes a open collector type bipolar transistor having its collector terminal connected to a bus connecting line which is directly connected to an associated bus transceiver.

9. A bus according to claim 1, further comprising connector means arranged between said second bus transceiver and said parallel coupling portion, such that said second bus transceiver is rendered removable from and mountable on said second bus connecting line by said connector means even when said second bus is operating.

10. A bus according to claim 1, wherein said first and second bus connecting line portions in said parallel coupling portion are arranged on different layers of a multi-layer board, one surface of which is grounded, with their vertical positions being aligned, and each of said bus connecting line portions is surrounded horizontally by lines connected to the ground potential.

11. A bus according to claim 1, further comprising connector means between said printed circuit board and the rest of said first and second bus connecting line portions, such that said parallel coupling portion on said printed circuit board is rendered removable from and mountable on said rest of the bus connecting line portions.

12. A bus according to claim 11, further comprising connector means arranged between said first bus transceiver and said parallel coupling portion and connector means arranged between said second bus transceiver and said parallel coupling portion, such that said first bus transceiver and said second bus transceiver are rendered removable from and mountable on the rest of the bus connecting line portions.

13. A bus according to claim 1, wherein said first and second bus transceivers are included in first and second signal processing means, respectively.

14. A bus according to claim 1, wherein said first and second bus transceivers are provided as discrete parts from first and second signal processing means connected directly thereto through respective signal lines.

15. A fast data transfer bus comprising:

a first bus connecting line for transferring a data pulse signal;

a first bus transceiver connected to one end of said first bus connecting line;

a first termination resistor connected to the other end of said first bus connecting line for impedance matching;

a second bus transceiver connected to the other end of said first bus connecting line;

a second termination resistor connected to the one end of said first bus connecting line;

a second bus connecting line for transferring a data pulse signal;

a third bus transceiver connected to one end of said second bus connecting line;

a third termination resistor connected to the other end of said second bus connecting line for impedance matching;

a fourth bus transceiver connected to the other end of said second bus connecting line;

a fourth termination resistor connected to the one end of said second bus connecting line for impedance matching; and a supporting member for holding substantially constant an interval between said first and second bus connecting lines in a parallel coupling portion of a predetermined length of said first and second bus connecting lines for producing capacitive and inductive coupling between both said bus connecting lines, said supporting member having around layer provided on one side of said first and second bus connecting lines so as to be spaced therefrom through an insulating material, wherein each of said first, second, third, and fourth bus transceivers includes a bus driver and a bus receiver, and the bus receiver in each of the bus transceivers connected to one bus connecting line generates a pulse signal substantially equal to an output pulse signal which was generated by the bus driver in each of the bus transceivers connected to the other bus connecting line, based on forward and backward crosstalk induced by said output pulse signal in said parallel coupling portion on said one bus connecting line, and direct data transfer is enabled between said first and second transceivers and between said third and fourth transceivers.

16. A bus according to claim 1, further comprising voltage dividing resistors for producing two reference voltages from a power supply voltage, and wherein:

said bus driver in said other bus transceiver is constituted by an open-drain type transistor, an open-collector type transistor or push-pull type transistors, the other end of one bus connecting line associated with the other bus transceiver is terminated to a potential substantially half of said power supply voltage via an associated termination resistor, the other end of the other bus connecting line associated with said one bus transceiver is terminated to said potential via an associated termination resistor, one end of said the other bus connecting line is connected to said bus receiver in said one bus transceiver, and said two reference voltages are applied to said bus receiver.

* * * * *